(12) United States Patent
Hall et al.

(10) Patent No.: US 11,818,223 B2
(45) Date of Patent: *Nov. 14, 2023

(54) INTER-SESSION AUTOMATION FOR ROBOTIC PROCESS AUTOMATION (RPA) ROBOTS

(71) Applicant: UiPath, Inc., New York, NY (US)

(72) Inventors: Andrew Hall, Bellevue, WA (US); Alison Tai, Seattle, WA (US)

(73) Assignee: UiPath, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/583,044

(22) Filed: Jan. 24, 2022

(65) Prior Publication Data

US 2022/0150316 A1 May 12, 2022

Related U.S. Application Data

(63) Continuation of application No. 15/930,906, filed on May 13, 2020, now Pat. No. 11,233,861, which is a
(Continued)

(51) Int. Cl.
*G06F 3/00* (2006.01)
*H04L 67/146* (2022.01)
(Continued)

(52) U.S. Cl.
CPC ............ *H04L 67/146* (2013.01); *H04L 67/01* (2022.05); *H04L 67/02* (2013.01)

(58) Field of Classification Search
CPC ..................................................... G06F 9/54
See application file for complete search history.

(56) References Cited

U.S. PATENT DOCUMENTS

| 7,013,465 B1 | 3/2006 | Taylor et al. |
| 7,080,385 B1 | 7/2006 | Collison et al. |

(Continued)

FOREIGN PATENT DOCUMENTS

| CN | 102473106 B | 4/2015 |
| CN | 107666987 A | 2/2018 |

(Continued)

OTHER PUBLICATIONS

K P Naveen Reddy, A Study of Robotic Process Automation Among Artificial Intelligence. (Year: 2019).*

(Continued)

*Primary Examiner* — Lechi Truong
(74) *Attorney, Agent, or Firm* — LeonardPatel PC; Michael A. Leonard, II; Sheetal S. Patel

(57) ABSTRACT

Inter-session automation for RPA is disclosed. A robot or another application or process running in the user session may interact with an application, but one or more attended RPA robots in one or more child sessions perform operations and fetch data that the user session robot will then use to interact with the application in the user session. Attended RPA robots in client sessions may share data through an IPC protocol, by storing data in a persistent data store, such as a spreadsheet, an object-oriented database, a plain text file, another data store or file, etc. The user session robot or another application or process running in the parent session can then read this information and respond accordingly.

21 Claims, 20 Drawing Sheets

Related U.S. Application Data continuation-in-part of application No. 16/793,064, filed on Feb. 18, 2020, now Pat. No. 10,654,166.

(51) Int. Cl.
  *H04L 67/02* (2022.01)
  *H04L 67/01* (2022.01)

(56) References Cited

U.S. PATENT DOCUMENTS

| | | | |
|---|---|---|---|
| 7,478,402 | B2 | 1/2009 | Christensen et al. |
| 7,899,915 | B2 | 3/2011 | Reisman |
| 8,402,431 | B2 | 3/2013 | DeBoer et al. |
| 9,552,056 | B1 | 1/2017 | Barry et al. |
| 10,324,457 | B2 | 6/2019 | Neelakandan et al. |
| 10,339,027 | B2 | 7/2019 | Garcia et al. |
| 10,503,627 | B2 | 12/2019 | Radhakrishnan et al. |
| 10,572,316 | B2 | 2/2020 | Carteri et al. |
| 10,654,166 | B1 | 5/2020 | Hall |
| 10,860,905 | B1 | 12/2020 | Gligan et al. |
| 10,911,546 | B1 | 2/2021 | Goswami et al. |
| 11,130,233 | B2 | 9/2021 | Hall |
| 11,157,339 | B1 | 10/2021 | Dines |
| 11,171,989 | B1 | 11/2021 | Kim |
| 11,233,861 | B2 | 1/2022 | Hall et al. |
| 11,307,876 | B1* | 4/2022 | Leonard, II ............ G06F 3/0482 |
| 11,366,644 | B1* | 6/2022 | Krebs ..................... G06F 9/451 |
| 2002/0105296 | A1 | 8/2002 | Okuyama et al. |
| 2003/0191559 | A1 | 10/2003 | Chatsinchai et al. |
| 2004/0015266 | A1 | 1/2004 | Skoog |
| 2005/0262052 | A1 | 11/2005 | Daniels et al. |
| 2006/0184293 | A1 | 8/2006 | Konandreas et al. |
| 2009/0064177 | A1 | 3/2009 | Bauer et al. |
| 2010/0076600 | A1 | 3/2010 | Cross et al. |
| 2012/0324359 | A1* | 12/2012 | Lee ..................... G06F 11/3438 715/733 |
| 2012/0331404 | A1 | 12/2012 | Buford et al. |
| 2013/0297678 | A1 | 11/2013 | Schach et al. |
| 2015/0363224 | A1 | 12/2015 | Argenti et al. |
| 2016/0259651 | A1 | 9/2016 | Nychis et al. |
| 2016/0259655 | A1 | 9/2016 | Nychis et al. |
| 2016/0288322 | A1 | 10/2016 | Lin et al. |
| 2017/0052824 | A1 | 2/2017 | Sharma et al. |
| 2017/0076194 | A1 | 3/2017 | Versace et al. |
| 2017/0295243 | A1 | 10/2017 | Kim |
| 2018/0041591 | A1 | 2/2018 | Yoden |
| 2018/0074636 | A1 | 3/2018 | Lee et al. |
| 2018/0074931 | A1 | 3/2018 | Garcia et al. |
| 2018/0121217 | A1 | 5/2018 | Jarabek et al. |
| 2018/0197123 | A1 | 7/2018 | Parimelazhagan et al. |
| 2018/0370033 | A1 | 12/2018 | Geffen et al. |
| 2019/0004932 | A1 | 1/2019 | Misra et al. |
| 2019/0022856 | A1 | 1/2019 | Kulläng |
| 2019/0122200 | A1 | 4/2019 | Kurian |
| 2019/0129824 | A1 | 5/2019 | Radhakrishnan et al. |
| 2019/0130094 | A1 | 5/2019 | Votaw et al. |
| 2019/0132229 | A1 | 5/2019 | McCormack et al. |
| 2019/0138600 | A1 | 5/2019 | Krishnan et al. |
| 2019/0155225 | A1 | 5/2019 | Kothandaraman et al. |
| 2019/0171845 | A1 | 6/2019 | Dotan-Cohen et al. |
| 2019/0215283 | A1 | 7/2019 | Nahum et al. |
| 2019/0303779 | A1 | 10/2019 | Briggle et al. |
| 2020/0001471 | A1 | 1/2020 | Chen et al. |
| 2020/0004798 | A1* | 1/2020 | Weinert, Jr. ......... G06F 16/9577 |
| 2020/0019283 | A1 | 1/2020 | Nychis et al. |
| 2020/0147791 | A1 | 5/2020 | Safary et al. |
| 2020/0180155 | A1 | 6/2020 | Hall |
| 2020/0213422 | A1 | 7/2020 | Pandya et al. |
| 2020/0233707 | A1 | 7/2020 | Ramamurthy et al. |
| 2020/0246978 | A1 | 8/2020 | Johnson et al. |
| 2020/0348654 | A1 | 11/2020 | Anand et al. |
| 2020/0348960 | A1 | 11/2020 | Krishnamurthy et al. |
| 2020/0348964 | A1 | 11/2020 | Anand et al. |
| 2020/0356395 | A1* | 11/2020 | Deng ................. G06F 9/45512 |
| 2021/0042338 | A1 | 2/2021 | Smutko et al. |
| 2021/0086354 | A1 | 3/2021 | Berg et al. |
| 2021/0109717 | A1 | 4/2021 | Voicu et al. |
| 2021/0125025 | A1 | 4/2021 | Kuo et al. |
| 2021/0129325 | A1 | 5/2021 | Yu et al. |
| 2021/0146537 | A1 | 5/2021 | Bannoura |
| 2021/0252703 | A1 | 8/2021 | Hall |
| 2021/0258389 | A1 | 8/2021 | Hall et al. |
| 2022/0011732 | A1 | 1/2022 | Hall |
| 2022/0012152 | A1 | 1/2022 | Dines |
| 2022/0070246 | A1 | 3/2022 | Ripa |
| 2023/0033945 | A1* | 2/2023 | Xue ..................... G06N 3/0442 |

FOREIGN PATENT DOCUMENTS

| | | |
|---|---|---|
| CN | 109074402 A | 12/2018 |
| CN | 109118347 A | 1/2019 |
| CN | 109636504 A | 4/2019 |
| CN | 201910345536 A | 7/2019 |
| CN | 110286998 A | 9/2019 |
| CN | 110648054 A | 1/2020 |
| JP | 2006000954 A | 1/2006 |
| JP | 5607741 B2 | 10/2014 |
| JP | 2018535459 A | 11/2018 |
| JP | 6532626 B1 | 6/2019 |
| JP | 2019159556 A | 9/2019 |
| JP | 2019169044 A | 10/2019 |
| JP | 2020003905 A | 1/2020 |
| JP | 202000017099 | 1/2020 |
| JP | 2020092400 A | 6/2020 |
| KR | 1020180123513 A | 11/2018 |
| WO | 2017176917 A1 | 10/2017 |
| WO | 2021167644 A1 | 8/2021 |

OTHER PUBLICATIONS

James W.McKee, A Graphical, Rule Based Robotic Interface System. (Year: 1988).*

Notice of Allowance issued in Korean Application No. 10-2020-7028231 dated Nov. 4, 2022.

Notification of Reasons for Refusal issued in Japanese Application No. 2020-553457 dated Nov. 4, 2022.

"Run robot scripts in separate 'Sessions'" question page available at https://github.com/damies13/rfswarm/issues/61 (Jan. 10, 2020).

Abdou K Seye, "Notice of Allowance", dated May 20, 2022, U.S. Appl. No. 16/925,544.

Brugali, et al. "Distributed Computing in Robotics and Automation", 2002.

Chacon-Montero, et al. "Towards a Method for Automated Testing in Robotic Process Automation Projects", 2019.

Gauthier, et al., "Interprocess Communication for Distributed Robotics", 1987.

Notice of Allowance issued in Chinese Application No. 202010894023.7 dated Jul. 4, 2022.

Notice of Allowance issued in Taiwanese Application No. 109133853 dated Apr. 27, 2022.

Office Action received in European Application No. 20197271.8 dated Jun. 10, 2022.

First Office Action issued in Chinese Application No. 202080002309.8 dated Aug. 1, 2022.

Notice of Allowance issued in Korean Application No. 10-2020-7028190 dated Aug. 27, 2022.

Radoslaw Dukalski, Portable rapid visual workflow simulation tool for human robot coproduction. (Year: 2017).

Remote Desktop ActiveX Control Classes Page available at https://docs.microsoft.com/en-us/windows/win32/termserv/remote-desktop-activex-control-classes (last accessed Jan. 20, 2022).

Remote Desktop ActiveX Control Classes page available at https://docs.microsoft.com/en-us/windows/win32/termserv/remote-desktop-activex-control-classes (last accessed Jan. 21, 2022).

Shinichi Hoshi, "Let's Warp, OS / 2 Programming 3rd Multitasking System's Interprocess Communication," DDJ (Dr. Dobb's Journal Japan), Shoeisha Co., Ltd., pp. 170-176 (Jul. 1, 1995).

Solomiya Yatskiv, Improved Method of Software Automation Testing Based on the Robotic Process Automation Technology. (Year: 2019).

(56) References Cited

OTHER PUBLICATIONS

Sumi Takano, "How to create a parallel program in OS / 2 (I)," Information Processing, vol. 31, No. 10, Information Processing Society of Japan, pp. 1425-1432, ISS: 0447-8053 (Oct. 15, 1990).
Supplementary European Search Report issued for EP Application No. 20197271.8 dated Feb. 26, 2021.
UiPath Extension for Windows Remote Desktop page available at https://docs.uipath.com/studio/docs/extension-for-windows-remote-desktop (last accessed Feb. 14, 2020).
UiPath Robot Agent documentation available at https://docs.uipath.com/robot/docs/robot-agent (last accessed Feb. 14, 2020).
Windows Remote Desktop Services roles page available at https://docs.microsoft.com/en-us/windows-server/remote/remote-desktop-services/rds-roles (last accessed Jan. 20, 2022).
Anagnoste, Sorin, "Robotic Automation Process—The Operating System for the Digital Enterprise", 2018.
Lechi Truong, "Notice of Allowance", dated Mar. 23, 2022, U.S. Appl. No. 16/989,003.
Office Action issued in Chinese Application No. 202010894023.7 dated Feb. 8, 2022.
Search Report issued in Chinese Application No. 202010894023.7 dated Feb. 8, 2022.
"17th Annual Meeting in Shimane Prefectural CIO Forum RPA Technologies Autonomy Introducing RPA that succeeds with the body Why is it easy to deploy horizontally even at a small start?," Nikkei BP Government Technology, Fall 2019 (No. 40), Nikkei BP, pp. 32 and 33 (Oct. 2019).
"About Session 0", Teratail [online], Leverages Co., Ltd., 201 Aug. 6, 2006, [search on Jul. 21, 3rd year of Reiwa], https://teratail.com/questions/6404.
"Connecting to a Console Session with Windows Remote Desktop", Tech TIPS-@IT, [online], ITmedia, Inc., Apr. 10, 2009 [Jul. 21, Reiwa 3], atmarkit.co.jp/ait/articles/0501/15/news014.html.
"Robotic Desktop Automation in 2021: In-depth Guide," available at https://research.aimultiple.com/rda/ (last accessed Mar. 22, 2021).
"Robotic process automation in a virtual environment," available at pwc.in/assets/pdfs/publications/2018/robotic-process-automation-in-a-virtual-environment.pdf (last accessed Mar. 22, 2021).
"Special feature RPA maxim 3 Forefront of tools and technology 5 maxims to prevent failure It's not dangerous if you know the rules," Nikkei Computer, Issue No. 979, Nikkei BP, pp. 32 and 33, ISSN 0285-4619 (Dec. 6, 2018).
"Special feature: Production RPA 2 Tool enhancement 3 selection points," Nikkei Computer Data, issue No. 952, Nikkei BP, pp. 30-33, ISSN: 0285-4619 (Nov. 23, 2017).
"Unpacking the Intelligent Technology Powering NEVA (NICE Employee Virtual Attendant," available icsanalytics.com/wp-content/uploads/2018/10/NICE-Desktop-Automation-Whitepaper-ICS-Analytics.pdf (Oct. 1, 2018).
Abdou K Seye, "Final Office Action", dated Mar. 26, 2021, U.S. Appl. No. 16/924,910.
Abdou K Seye, "Non-Final Office Action", dated Nov. 6, 2020, U.S. Appl. No. 16/924,910.
Abdou K Seye, "Notice of Allowance", dated Sep. 15, 2021, U.S. Appl. No. 16/924,910.
AI Multiple Robotic Desktop Automation Guide available at https://blog.aimultiple.com/rda/ (Jan. 1, 2020).
Cristina-Claudia Osman, Robotic Process Automation: Lessons Learned from Case Studies. (Year: 2019).
David Gauthier, et al. "Interprocess Communication for Distributed Robotics", (Year: 1987).
Embedding Remote Desktop ActiveX Control in a Webpage page available at https://docs.microsoft.com/en-us/windows/win32/termserv/embedding-the-remote-desktop-activex-control-in-a-web-page (last accessed Jan. 21, 2022).
European Search Report issued in EP Application No. 20199147 dated Mar. 11, 2021.
European Search Report issued in EP Application No. 20199191 dated Mar. 12, 2021.
Examination Report issued in EP Application No. 20197271.8 dated Mar. 25, 2021.
ICS Analytics NICE Desktop Automation Whitepaper available icsanalytics.com/wp-content/uploads/2018/10/NICE-Desktop-Automation-Whitepaper-ICS-Analytics.pdf (last accessed Feb. 18, 2020).
Inter-Bot Communication / Delegation Guide available at https://botpress.com/docs/tutorials/interbot (last accessed May 11, 2020).
International Search Report & Written Opinion, dated Apr. 1, 2021, PCT Application No. PCT/US20/63951.
International Search Report & Written Opinion, dated Apr. 8, 2021, PCT Application No. PCT/US20/51940.
International Search Report & Written Opinion, PCT Application No. PCT/US20/63964.
International Search Report and Written Opinion of the International Search Authority issued for PCT Application No. PCT/US2020/063912 dated Mar. 18, 2021.
International Search Report and Written Opinion of the International Search Authority issued for PCT Application No. PCT/US2020/063921 dated Mar. 18, 2021.
International Search Report and Written Opinion of the International Search Authority issued in PCT Application No. PCT/US2020/039886 dated Nov. 6, 2020.
International Search Report and Written Opinion of the International Search Authority issued in PCT Application No. PCT/US2020/051938 dated Mar. 26, 2021.
Jennifer L. Casper, Workflow Study on Human-Robot Interaction in USAR. (Year: 2002).
Kenichi Kawai, "Introduction to OS / 2," First Edition, Baifukan Co., Ltd., pp. 144-152, ISBN: 4-563-01340-4 (Jun. 30, 1988).
Lechi Truong, "Non-Final Office Action", dated Apr. 15, 2021, U.S. Appl. No. 16/874,593.
Lechi Truong, "Non-Final Office Action", dated Jun. 24, 2021, U.S. Appl. No. 15/930,906.
Lechi Truong, "Non-Final Office Action", dated Oct. 28, 2021, U.S. Appl. No. 16/989,003.
Lechi Truong, "Notice of Allowance", dated Apr. 13, 2020, U.S. Appl. No. 16/793,064.
Lechi Truong, "Notice of Allowance", dated Aug. 2, 2021, U.S. Appl. No. 16/989,064.
Lechi Truong, "Notice of Allowance", dated Jul. 29, 2021, U.S. Appl. No. 16/874,593.
Lechi Truong, "Notice of Allowance", dated Nov. 26, 2021, U.S. Appl. No. 15/930,906.
Michele Amoretti et al., "Architectural paradigms for robotics applications," Advanced Engineering Informatics, vol. 24, No. 1, pp. 4-13 (Jan. 1, 2010).
Microfocus RPA Architecture page available at https://docs.microfocus.com/itom/Robotic_Process_Automation:2019.07/RPAArch> (last accessed Dec. 30, 2020).
Microsoft Child Sessions documentation page available at https://docs.microsoft.com/en-us/windows/win32/termserv/child-sessions (May 31, 2018).
NICE RPA brochure available nice.com/rpa/assets/NICE_Advanced_Process_Automation-Brochure_2018.pdf (last accessed May 11, 2020).
NICE RPA chatbot page available nice.com/engage/blog/chatbots--robotic-automation--a-match-made-in-heaven-2315/ (last accessed May 11, 2020).
NICE RPA page available nice.com/rpa/robotic-automation/ (last accessed Jun. 15, 2020).
Notice of Allowance issued in Japanese Patent Application No. 2020-125401 dated Aug. 4, 2021.
Notice of Allowance issued in Korean Application No. 10-2020-0101943 dated Dec. 23, 2020.
Notice of Allowance issued in Taiwanese Application No. 109124314 dated May 4, 2021.
Notification of Reasons for Refusal issued in Japanese Patent Application No. 2020-125401 dated Dec. 15, 2020.
Official Letter and Search Report issued by the Taiwan Intellectual Property Office (TIPO) dated Jan. 29, 2021.
Pall Jensson, "Robotic Process Automation: Dynamic Roadmap for Successful Implementation" (2018).

(56) References Cited

OTHER PUBLICATIONS

PWC Robotic Process Automation in a Virtual Environment brochure available at https://www.pwc.in/assets/pdfs/publications/2018/robotic-process-automation-in-a-virtual-environment.pdf (May 2018).
Quang-Vinh Dang, Scheduling a single mobile robot for part-feeding tasks of production lines. (Year: 2014).
Notification of Reasons for Refusal issued in Japanese Application No. 2020-553457 dated Apr. 10, 2023.
Second Office Action issued in Chinese Application No. 202080002309.8 dated Jan. 20, 2023.
Abdou K Seye, "Non-Final Office Action", dated Aug. 18, 2023, U.S. Appl. No. 17/867,131.
Billmers, Meyer A., "Mini-Robot Group User's Guide", MIT, 1974.
Lechi Truong, "Non-Final Office Action", dated Aug. 3, 2023, U.S. Appl. No. 17/697,871.
Notice of Allowance issued in U.S. Appl. No. 17/867,238 dated Jun. 30, 2023.
Examination Report issued in EP Application No. 20199191.6 dated Jul. 19, 2023.
Examination Report issued in European Application No. 20199147.8 dated Sep. 1, 2023.

\* cited by examiner

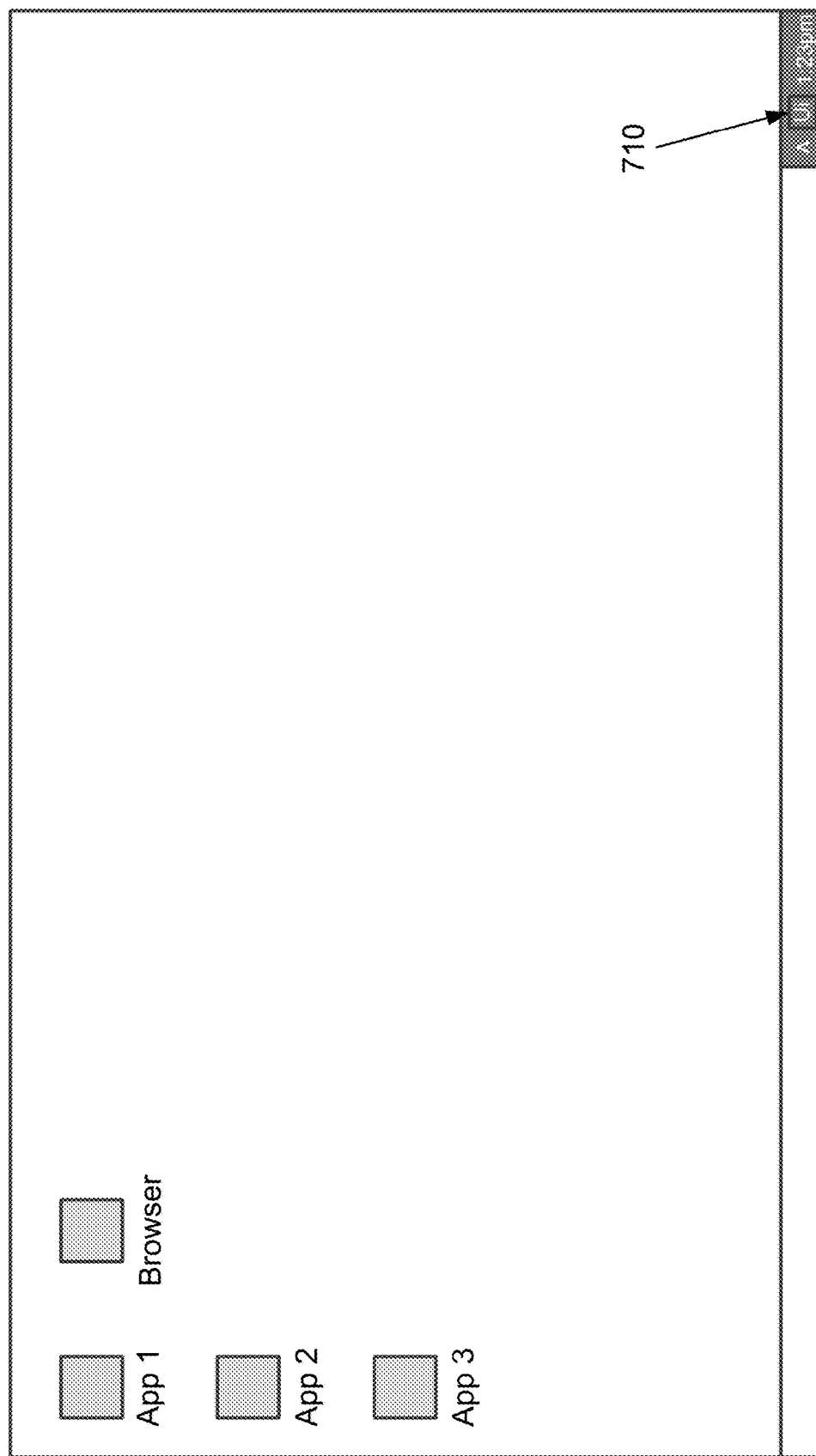

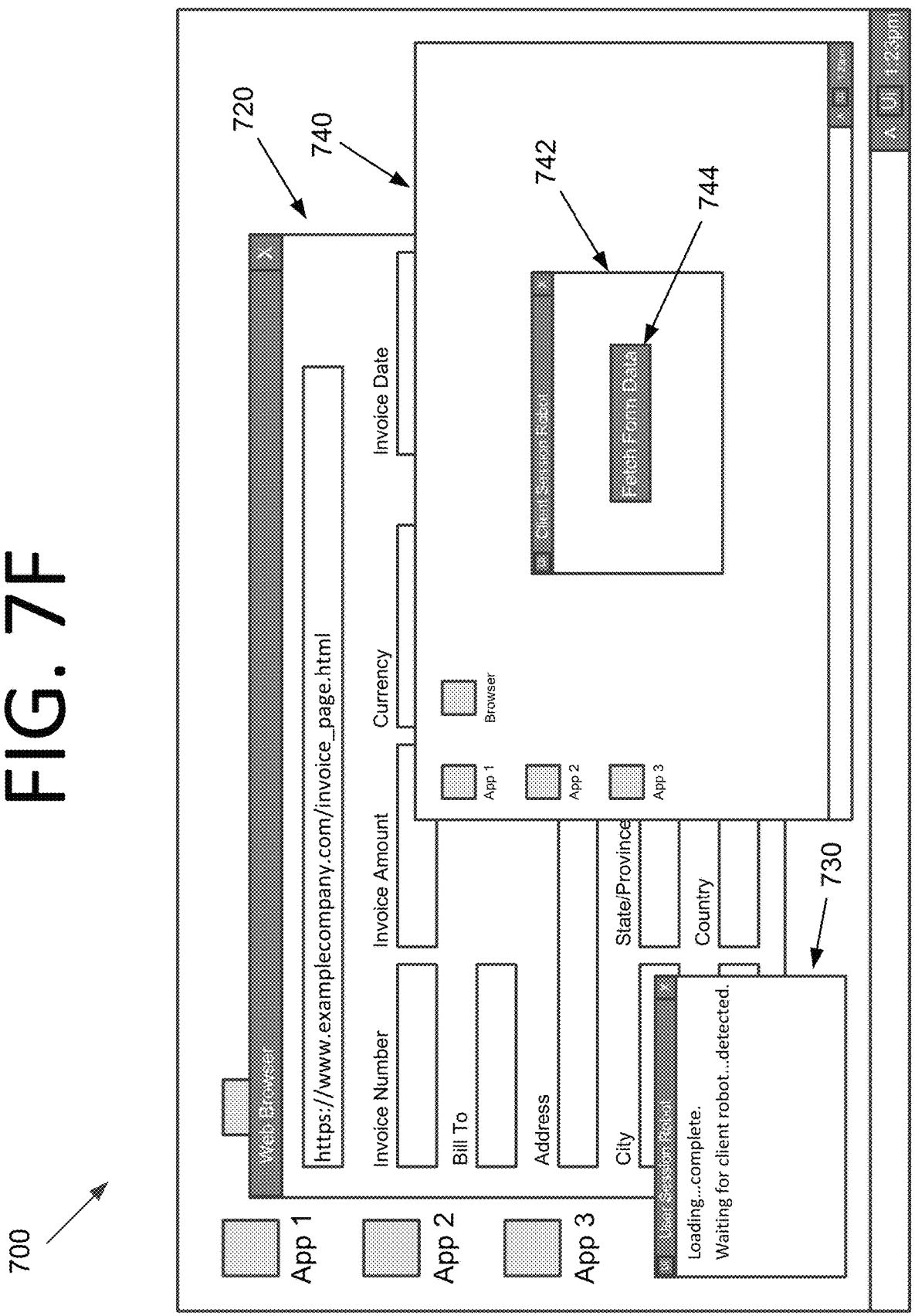

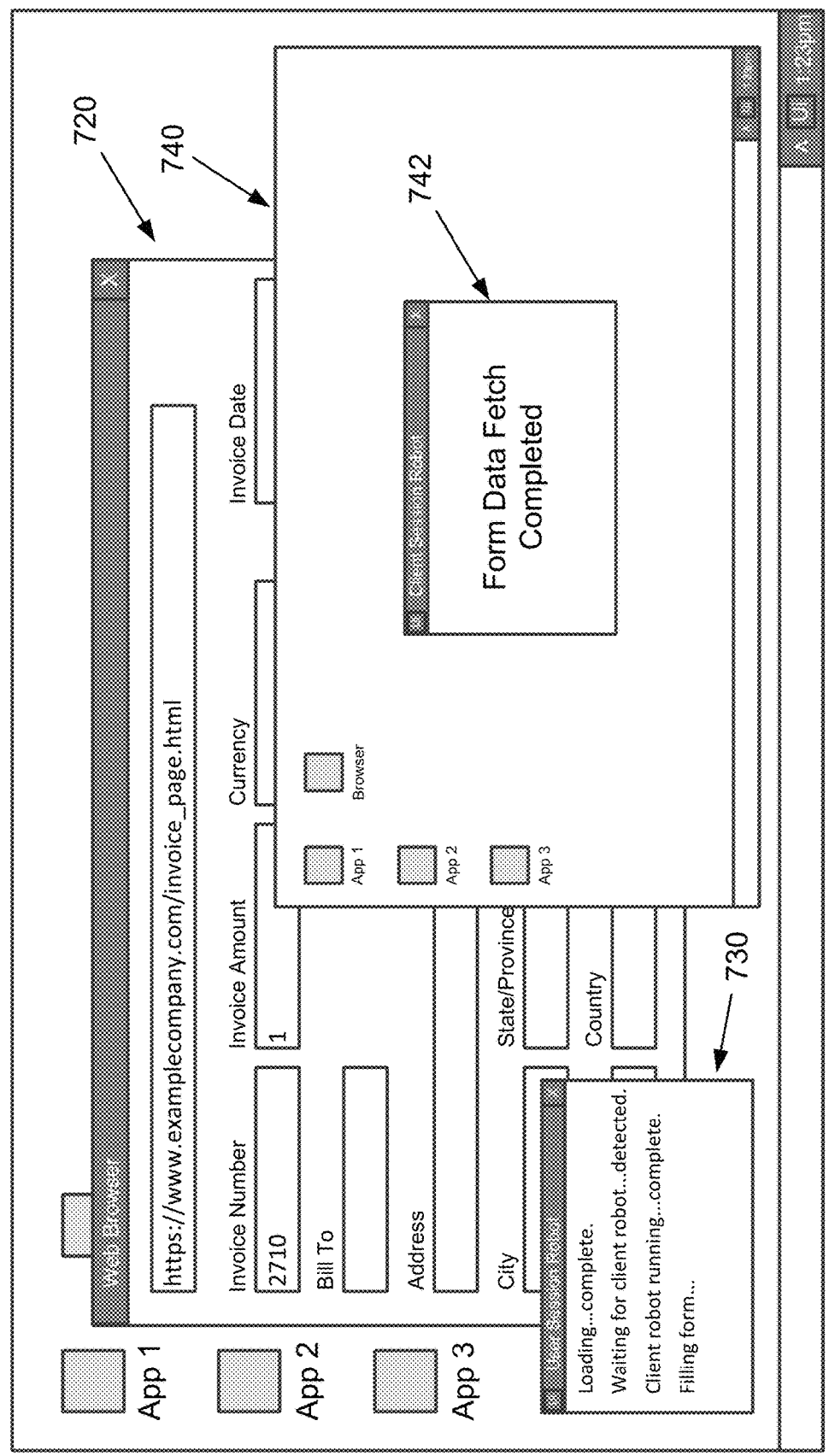

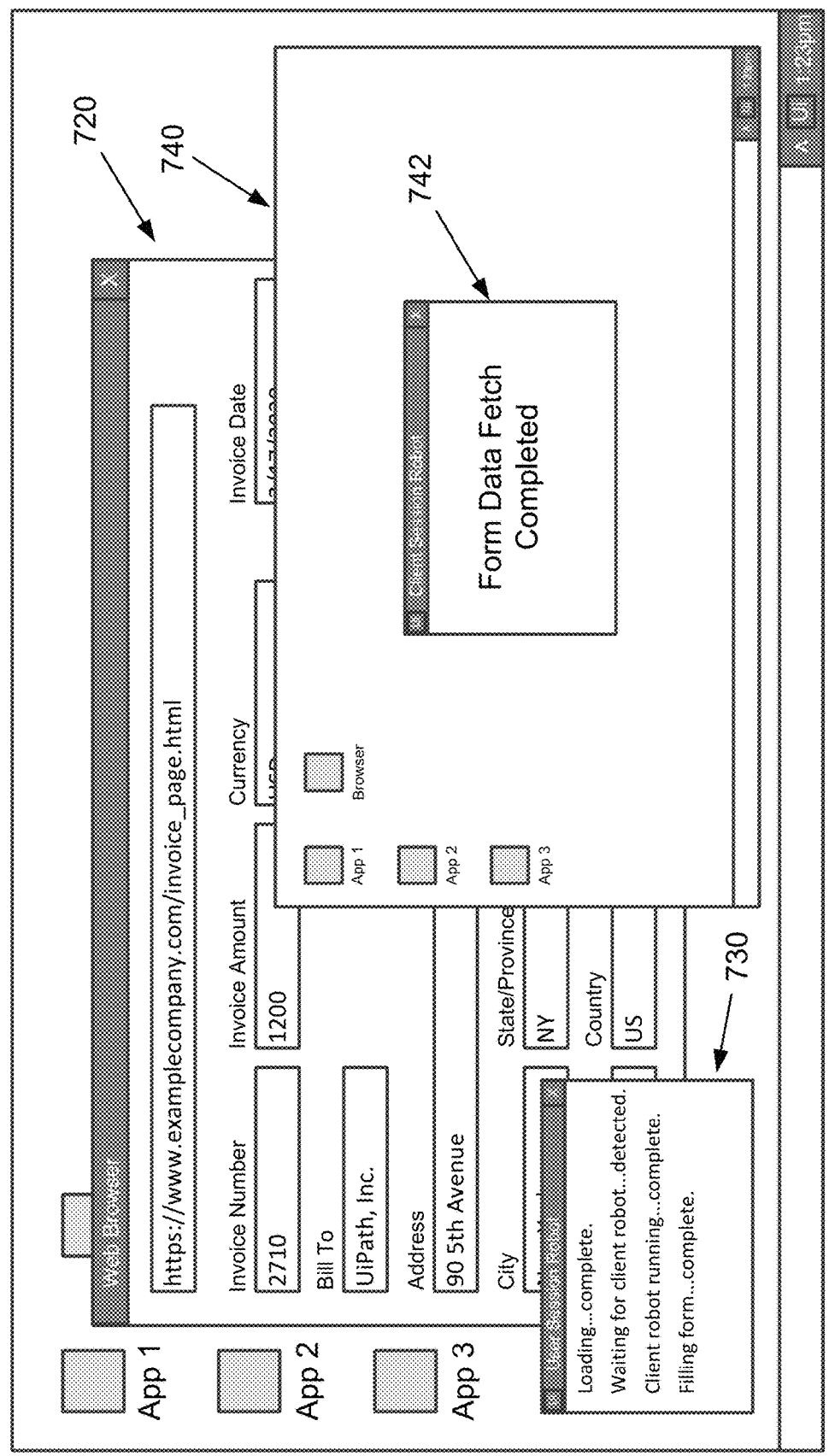

FIG. 7J

INTER-SESSION AUTOMATION FOR ROBOTIC PROCESS AUTOMATION (RPA) ROBOTS

CROSS-REFERENCE TO RELATED APPLICATIONS

This application is a continuation of U.S. patent application Ser. No. 15/930,906 filed May 13, 2020, which issued as U.S. Pat. No. 11,233,861 on Jan. 25, 2022, and is a continuation-in-part (CIP) of U.S. Nonprovisional patent application Ser. No. 16/793,064 filed Feb. 18, 2020, which issued as U.S. Pat. No. 10,654,166 on May 19, 2020. This subject matter of these earlier filed applications is hereby incorporated by reference in its entirety.

FIELD

The present invention generally relates to robotic process automation (RPA), and more specifically, to inter-session automation for RPA robots.

BACKGROUND

Attended automation RPA robots typically run on a computing system operated by a user in the same session as that user. The attended RPA robots may work with a user to accomplish certain tasks at a user's command, for example. However, in attended automation scenarios, the RPA robot may "take over" the user's computing system. The user may wish to perform other activities while the robot is interacting with the computing system, but the user is prevented from doing so. In other words, the robot controls applications through the user interface (UI) in the same manner that the user would (e.g., simulating mouse clicks and keyboard input).

Various technologies exist that create complete or partial copies of an operating system or the applications running thereon. Emulators have been around for decades and may provide developers with the ability to test and debug applications. For instance, emulators may provide developers with the ability to test and debug mobile applications that use an operating system that does not support running development tools directly. Both Android® and iOS® offer emulators that can be run from a development machine to test and debug an Android® or iOS® application since the developer tools cannot be natively run on those mobile operating systems.

Simulators allow a developer to host a window on his or her local machine that lets the developer test and debug behavior of an application that are difficult or impossible to perform on a development machine. For example, simulators allow the developer to click a button to rotate the simulator, which tells the application running inside the simulator the device has been rotated for the purposes of testing and debugging application behavior that responds to these events. Another common example is multi-touch. Many developer machines do not support touch, so the simulator lets the developer test and debug how the application responds to multiple touch points. Android® and iOS® emulators also offer simulation capabilities. Furthermore, Microsoft® offers a simulator for their Universal Windows Platform (UWP) applications.

Virtual machines host a second operating system on the machine and can be opened and monitored through a window. This runs a completely different operating system and shares the hardware with the host machine. The "guest" machine must have its own copies of applications installed and does not share common resources or files with the user machine.

Docker® containers are conceptually a hybrid form of virtual machine. All of the applications that need to be executed are packaged into an immutable package that is executed directly on the host operating system. The package is not a complete copy of another operating system, but it does not by default share or have access to any of the applications or resources on the host machine. Thus, from a user experience perspective, Docker® containers feel similar to a virtual machine, but technically, the containers are not executing on a completely separate operating system.

However, conventional emulators, simulators, virtual machines (VMs), and hybrid VMs providing operating system (OS)-level virtualization (e.g., Docker® containers) do not address the issues that arise with attended automation robots operating on the same computing system as the user. Thus, the user essentially becomes a spectator for his or her own computing system, watching the robot work and being unable to interact with other applications on the machine that require user interaction. Accordingly, an improved approach may be beneficial.

SUMMARY

Certain embodiments of the present invention may provide solutions to the problems and needs in the art that have not yet been fully identified, appreciated, or solved by current RPA technologies. For example, some embodiments of the present invention pertain to inter-session automation for RPA robots.

In an embodiment, a computer-implemented method includes launching a user session process in a user session and launching a first client session RPA robot in a first client session. The computer-implemented method also includes executing a workflow of the first client session RPA robot in the first client session, by the first client session RPA robot, and making results of the execution of the workflow of the first client session RPA robot available to the user session process, by the first client session RPA robot. The computer-implemented method further includes interacting with an application in the user session using the results of the execution of the workflow of the first client session RPA robot, by the user session process.

In another embodiment, a computer-implemented method includes executing a workflow of a client session RPA robot in a client session, by the client session RPA robot, and making results of the execution of the workflow of the client session RPA robot available to a user session RPA robot, by the client session RPA robot. The computer-implemented method also includes interacting with an application on a computing system using the results of the execution of the workflow of the client session RPA robot, by the user session RPA robot.

In yet another embodiment, a computer-implemented method includes executing a workflow of a client session RPA robot in a client session, by the client session RPA robot, and making results of the execution of the workflow of the client session RPA robot available to a user session RPA robot, by the client session RPA robot. The computer-implemented method also includes interacting with an application on a computing system using the results of the execution of the workflow of the client session RPA robot, by the user session RPA robot. The user session RPA robot and the client session RPA robot collectively complete execution of a larger workflow that includes the workflow of the client session RPA robot.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIGS. 7A-J are screenshots illustrating an example of completing a form in a user session using an RPA robot running in a client session and a user session robot or another application or process running in the user session, according to an embodiment of the present invention.

Unless otherwise indicated, similar reference characters denote corresponding features consistently throughout the attached drawings.

DETAILED DESCRIPTION OF THE EMBODIMENTS

Figure 1:
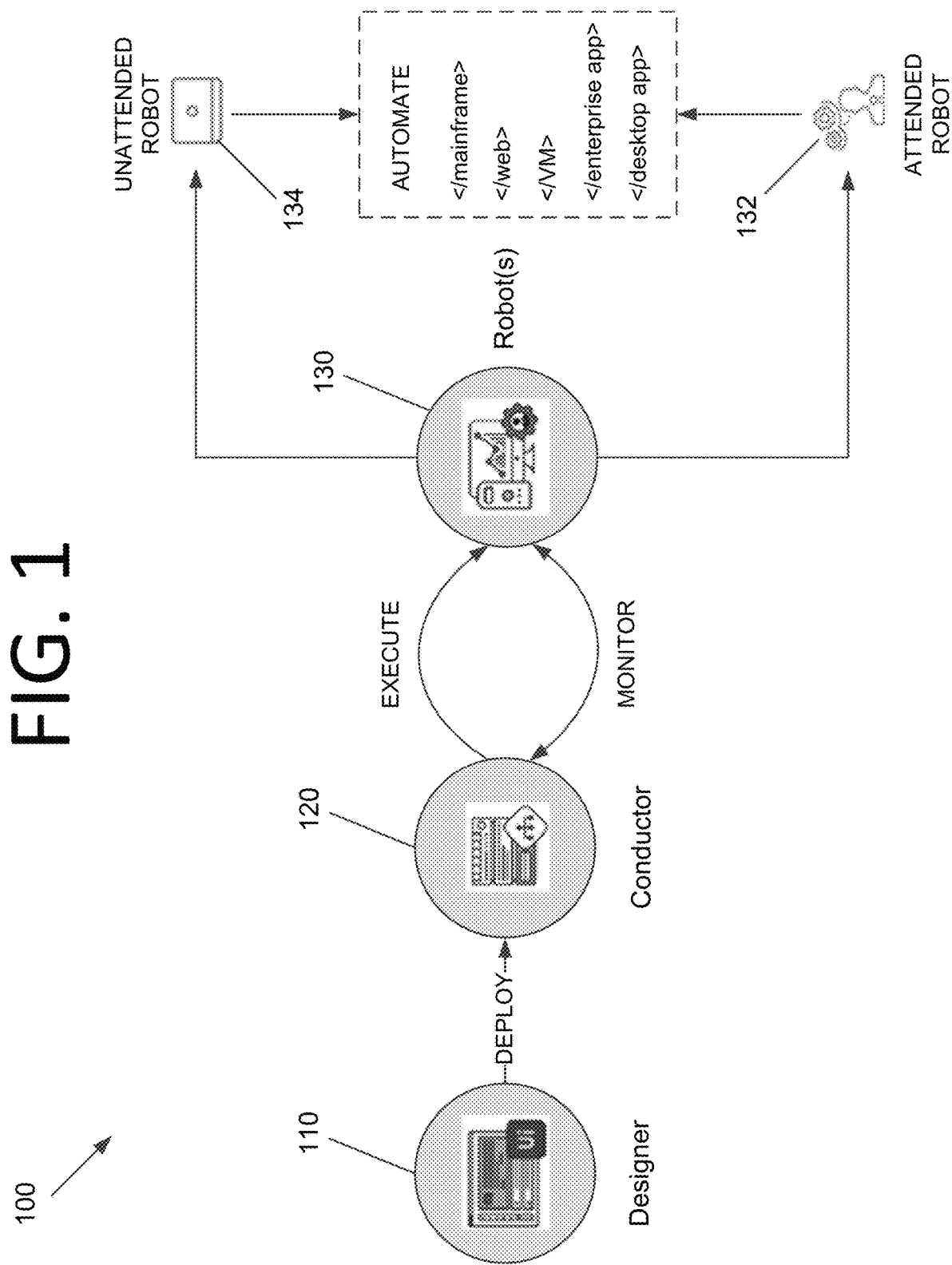
FIG. 1 is an architectural diagram illustrating a robotic process automation (RPA) system, according to an embodiment of the present invention.

Some embodiments pertain to inter-session automation for attended RPA. For instance, a form (e.g., a web page, a spreadsheet, another application having fillable fields, etc.) may be displayed in a user session (also called a main session or a parent session herein). A robot or another application or process running in the user session may interact with the form, but one or more attended RPA robots in one or more child sessions (also called client sessions, robot sessions, or secondary sessions herein) may perform operations and fetch data that the user session robot will then use to populate the form in the user session. Attended RPA robots in client sessions may share data through an Inter-Process Communication (IPC) protocol, by storing data in a persistent data store including, but not limited to, a spreadsheet, an object-oriented database, a plain text file, another data store or file, etc. The user session robot or another application or process running in the parent session could then read this information and respond accordingly (e.g., by filling out a form using the information). In this manner, the operation of the attended automation robot(s) may not prevent the user from using other applications or instances when the client session RPA robot(s) are performing their workflows, but the input provided by the user session RPA robot is visible to the user in the user session when the user session robot fills it into an application.

In some embodiments, the process may operate as follows. A user may click a button or otherwise cause an RPA robot to launch in a child session of the user session (e.g., the parent or main session that is launched when the user boots up his or her computing system). In certain embodiments, the robot session may already be running, or may be separately launched by the user from a robot tray, for example. The robot tray in some embodiments may be a Windows® Presentation Foundation (WPF) application that displays the available jobs in a system tray window. The user may cause the robot to execute its workflow in the child session, and the robot may then interact with one or more applications in the main session. The robot functionality could be initiated by the user clicking a button in the main session that calls the robot in some embodiments. In certain embodiments, the user session robot may initiate the client session robot.

In some embodiments, the client session robot may stop operation and provide a message if at least one application on which the workflow operates has not been launched. In certain embodiments, the user session robot or other user session application or process may launch application(s) if they are not open. If the operating system permits such operations, the client session robot may launch the application in the parent session. As the client session robot makes data available for the user session robot, the data may become visible in the main session as the user session robot fills it in.

In some embodiments, a user may cause a robot to execute a workflow in the client session that goes to a website, collects some information, and makes the information available for a user session robot or another application or process to access and enter in a spreadsheet that is visible in the main session, for example. In certain embodiments, an application, such as Salesforce®, is open in the main session. The user or user session robot then runs an automation in the client session that receives the client ID from the main session, goes to a website (e.g., HubSpot®), and collects information pertaining to client interactions with the website, for example. However, attended RPA robots may interact with any suitable application(s) and/or may obtain data from any suitable source (e.g., a database, another application, etc.) without deviating from the scope of the invention.

In some embodiments, an RPA workflow of a user session robot running in the main session is able to cause a client session robot to run a secondary workflow in the client session. Objects can be passed back and forth between the workflows in some embodiments via IPC, for example, data can be stored by the client session robot that the user session robot can access, etc. This may be beneficial for cases where parts of a workflow take a relatively long time to complete. Were the user to be prevented to interacting with his or her computing system, the user may not be productive if the user session robot performed all of the workflow activities. However, by operating the robot from a different session, some embodiments allow the user to access other applications/instances while the robot is performing its tasks.

Applications of some embodiments include, but are not limited to, emulators, simulators, VMs, and hybrid VMs providing OS-level virtualization (e.g., Docker® containers). Some embodiments create and host one or more robot sessions as a window including the UIs of applications being controlled by respective attended automation robots. In certain embodiments, the robot session window may include only the application(s) that the client session robot is interacting with. As used herein, a "window" may apply to a window representing a UI shown within the main UI, a second screen of a second display of a computing system, a virtual desktop, an isolated environment (i.e., a window (referred to as the "host") that draws the UIs of all applications launched inside the environment (referred to as "children") and runs them in the context of the host session), etc. without deviating from the scope of the invention.

Running multiple sessions allows robot(s) to operate in their session(s) while the user and a user session robot interact with a first session (e.g., a parent session). The user may thus be able to interact with applications that the user session and client session robots are not currently using (e.g., the user could use Outlook® while the user session robot is moving data from Excel® to a web browser), or the user and the user session robot and/or client session robot may be able to interact with the same application if that application is capable of realizing this functionality (e.g., the user session robot or client session robot is interacting with one instance in a web browser while the user interacts with another instance).

The user and the robot(s) are both interacting with the same application installations and file system in some embodiments. Changes made via the robot(s) and the user in an application will be made as if a single user made them in some embodiments, rather than having the user and the robot each work with separate versions of the applications and file systems. In other words, the applications in such embodiments are the user's local Excel®, Outlook®, etc. Also, the local file system may be utilized with no additional configuration. This differs from a Docker® container, for example, which requires additional configuration steps to provide access to the file system of the host operating system to applications running in the container.

In some embodiments, any desired number of sessions for any number of robots may be created and used without deviating from the scope of the invention. For instance, a user and user session robot or another application or process may operate in a first session, a first client session robot may operate in a second session, a second client session robot may operate in a third session, etc. In certain embodiments, multiple robots may operate in a single session, potentially taking turns for interacting with one or more common applications.

The functionality for creating the session may be implemented via Windows® Terminal Services Child Sessions, for example, which can create a session back into a user's own machine without the user having to log out. The newly created session may appear as a child window and may contain and launch applications that exist in the user's session. In other words, the separation between the user and the robot occurs at the UI level. If a file is deleted, for example, this occurs across all sessions running on the computing system.

In some embodiments, a hybrid virtual machine, such as Docker®, may be used. Hybrid virtual machines allow remote UI to be used to run applications and robots inside a container. Such embodiments may isolate robots contained therein and grant permissions on a per-permission basis. The robot has to "punch holes" for anything outside of the container. As such, the container is essentially its own sandbox with configurable permissions of how to "escape" (e.g., opening ports, mounting folders, etc.). In certain embodiments, a full virtual machine may be used.

Certain embodiments may be employed for robotic process automation (RPA). FIG. 1 is an architectural diagram illustrating an RPA system 100, according to an embodiment of the present invention. RPA system 100 includes a designer 110 that allows a developer to design and implement workflows. Designer 110 may provide a solution for application integration, as well as automating third-party applications, administrative Information Technology (IT) tasks, and business IT processes. Designer 110 may facilitate development of an automation project, which is a graphical representation of a business process. Simply put, designer 110 facilitates the development and deployment of workflows and robots.

The automation project enables automation of rule-based processes by giving the developer control of the execution order and the relationship between a custom set of steps developed in a workflow, defined herein as "activities." One commercial example of an embodiment of designer 110 is UiPath Studio™. Each activity may include an action, such as clicking a button, reading a file, writing to a log panel, etc. In some embodiments, workflows may be nested or embedded.

Some types of workflows may include, but are not limited to, sequences, flowcharts, FSMs, and/or global exception handlers. Sequences may be particularly suitable for linear processes, enabling flow from one activity to another without cluttering a workflow. Flowcharts may be particularly suitable to more complex business logic, enabling integration of decisions and connection of activities in a more diverse manner through multiple branching logic operators. FSMs may be particularly suitable for large workflows. FSMs may use a finite number of states in their execution, which are triggered by a condition (i.e., transition) or an activity. Global exception handlers may be particularly suitable for determining workflow behavior when encountering an execution error and for debugging processes.

Once a workflow is developed in designer 110, execution of business processes is orchestrated by conductor 120, which orchestrates one or more robots 130 that execute the workflows developed in designer 110. One commercial example of an embodiment of conductor 120 is UiPath Orchestrator™. Conductor 120 facilitates management of the creation, monitoring, and deployment of resources in an environment. Conductor 120 may act as an integration point, or one of the aggregation points, with third-party solutions and applications.

Conductor 120 may manage a fleet of robots 130, connecting and executing robots 130 from a centralized point. Types of robots 130 that may be managed include, but are not limited to, attended robots 132, unattended robots 134, development robots (similar to unattended robots 134, but used for development and testing purposes), and nonproduction robots (similar to attended robots 132, but used for development and testing purposes). Attended robots 132 may be triggered by user events or be scheduled to automatically happen, and operate alongside a human on the same computing system. Attended robots 132 may be used with conductor 120 for a centralized process deployment and logging medium. Attended robots 132 may help the human user accomplish various tasks, and may be triggered by user events. In some embodiments, processes cannot be started from conductor 120 on this type of robot and/or they cannot run under a locked screen. In certain embodiments, attended robots 132 can only be started from a robot tray or from a command prompt. Attended robots 132 should run under human supervision in some embodiments.

Unattended robots 134 run unattended in virtual environments or on physical machines, and can automate many processes. Unattended robots 134 may be responsible for remote execution, monitoring, scheduling, and providing support for work queues. Debugging for all robot types may be run from designer 110 in some embodiments. Both attended and unattended robots may automate various systems and applications including, but not limited to, mainframes, web applications, VMs, enterprise applications (e.g., those produced by SAP®, SalesForce®, Oracle®, etc.), and computing system applications (e.g., desktop and laptop applications, mobile device applications, wearable computer applications, etc.).

Conductor 120 may have various capabilities including, but not limited to, provisioning, deployment, versioning, configuration, queueing, monitoring, logging, and/or providing interconnectivity. Provisioning may include creating and maintenance of connections between robots 130 and conductor 120 (e.g., a web application). Deployment may include assuring the correct delivery of package versions to assigned robots 130 for execution. Versioning may include management of unique instances of some process or configuration in some embodiments. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., an SQL database) and/or another storage mechanism (e.g., ElasticSearch®, which provides the ability to store and quickly query large datasets). Conductor 120 may provide interconnectivity by acting as the centralized point of communication for third-party solutions and/or applications.

Robots 130 are execution agents that run workflows built in designer 110. One commercial example of some embodiments of robot(s) 130 is UiPath Robots™. In some embodiments, robots 130 install the Microsoft Windows® Service Control Manager (SCM)-managed service by default. As a result, such robots 130 can open interactive Windows® sessions under the local system account, and have the rights of a Windows® service.

In some embodiments, robots 130 can be installed in a user mode. For such robots 130, this means they have the same rights as the user under which a given robot 130 has been installed. This feature may also be available for High Density (HD) robots, which ensure full utilization of each machine at its maximum potential. In some embodiments, any type of robot 130 may be configured in an HD environment.

Robots 130 in some embodiments are split into several components, each being dedicated to a particular automation task. The robot components in some embodiments include, but are not limited to, SCM-managed robot services, user mode robot services, executors, agents, and command line. SCM-managed robot services manage and monitor Windows® sessions and act as a proxy between conductor 120 and the execution hosts (i.e., the computing systems on which robots 130 are executed). These services are trusted with and manage the credentials for robots 130. A console application is launched by the SCM under the local system.

User mode robot services in some embodiments manage and monitor Windows® sessions and act as a proxy between conductor 120 and the execution hosts. User mode robot services may be trusted with and manage the credentials for robots 130. A Windows® application may automatically be launched if the SCM-managed robot service is not installed.

Executors may run given jobs under a Windows® session (i.e., they may execute workflows). Executors may be aware of per-monitor dots per inch (DPI) settings. Agents may be Windows® Presentation Foundation (WPF) applications that display the available jobs in the system tray window. Agents may be a client of the service. Agents may request to start or stop jobs and change settings. The command line is a client of the service. The command line is a console application that can request to start jobs and waits for their output.

Having components of robots 130 split as explained above helps developers, support users, and computing systems more easily run, identify, and track what each component is executing. Special behaviors may be configured per component this way, such as setting up different firewall rules for the executor and the service. The executor may always be aware of DPI settings per monitor in some embodiments. As a result, workflows may be executed at any DPI, regardless of the configuration of the computing system on which they were created. Projects from designer 110 may also be independent of browser zoom level in some embodiments. For applications that are DPI-unaware or intentionally marked as unaware, DPI may be disabled in some embodiments.

Figure 2:
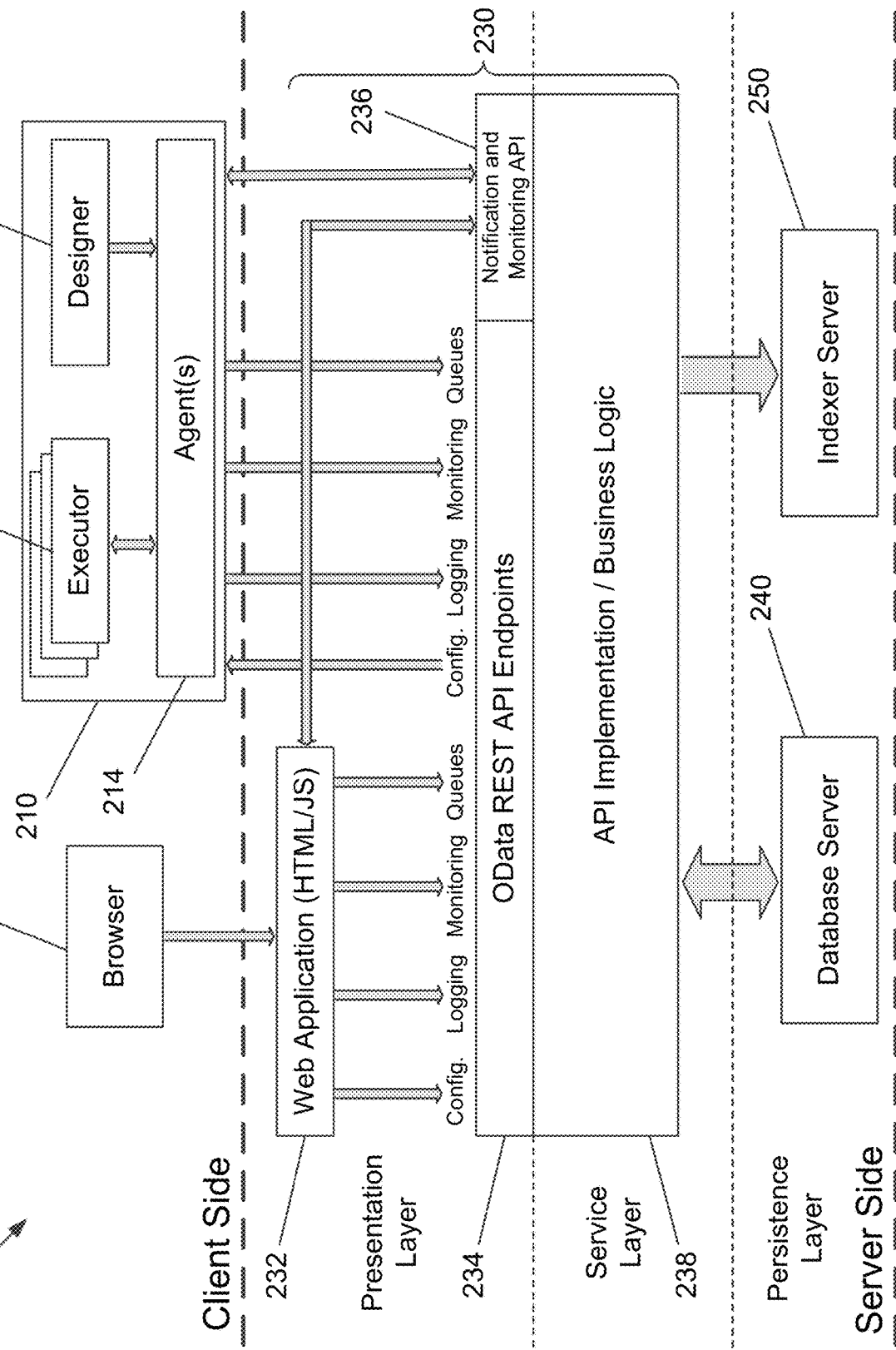
FIG. 2 is an architectural diagram illustrating a deployed RPA system, according to an embodiment of the present invention.

FIG. 2 is an architectural diagram illustrating a deployed RPA system 200, according to an embodiment of the present invention. In some embodiments, RPA system 200 may be, or may be a part of, RPA system 100 of FIG. 1. It should be noted that the client side, the server side, or both, may include any desired number of computing systems without deviating from the scope of the invention. On the client side, a robot application 210 includes executors 212, an agent 214, and a designer 216. However, in some embodiments, designer 216 may not be running on computing system 210. Executors 212 are running processes. Several business projects may run simultaneously, as shown in FIG. 2. Agent 214 (e.g., a Windows® service) is the single point of contact for all executors 212 in this embodiment. All messages in this embodiment are logged into conductor 230, which processes them further via database server 240, indexer server 250, or both. As discussed above with respect to FIG. 1, executors 212 may be robot components.

In some embodiments, a robot represents an association between a machine name and a username. The robot may manage multiple executors at the same time. On computing systems that support multiple interactive sessions running simultaneously (e.g., Windows® Server 2012), multiple robots may be running at the same time, each in a separate Windows® session using a unique username. This is referred to as HD robots above.

Agent 214 is also responsible for sending the status of the robot (e.g., periodically sending a "heartbeat" message indicating that the robot is still functioning) and downloading the required version of the package to be executed. The communication between agent 214 and conductor 230 is always initiated by agent 214 in some embodiments. In the notification scenario, agent 214 may open a WebSocket channel that is later used by conductor 230 to send commands to the robot (e.g., start, stop, etc.).

On the server side, a presentation layer (web application 232, Open Data Protocol (OData) Representative State Transfer (REST) Application Programming Interface (API) endpoints 234, and notification and monitoring 236), a service layer (API implementation/business logic 238), and a persistence layer (database server 240 and indexer server 250) are included. Conductor 230 includes web application 232, OData REST API endpoints 234, notification and monitoring 236, and API implementation/business logic 238. In some embodiments, most actions that a user performs in the interface of conductor 230 (e.g., via browser 220) are performed by calling various APIs. Such actions may include, but are not limited to, starting jobs on robots, adding/removing data in queues, scheduling jobs to run unattended, etc. without deviating from the scope of the invention. Web application 232 is the visual layer of the server platform. In this embodiment, web application 232 uses Hypertext Markup Language (HTML) and JavaScript (JS). However, any desired markup languages, script languages, or any other formats may be used without deviating from the scope of the invention. The user interacts with web pages from web application 232 via browser 220 in this embodiment in order to perform various actions to control conductor 230. For instance, the user may create robot groups, assign packages to the robots, analyze logs per robot and/or per process, start and stop robots, etc.

In addition to web application 232, conductor 230 also includes service layer that exposes OData REST API endpoints 234. However, other endpoints may be included without deviating from the scope of the invention. The REST API is consumed by both web application 232 and agent 214. Agent 214 is the supervisor of one or more robots on the client computer in this embodiment.

The REST API in this embodiment covers configuration, logging, monitoring, and queueing functionality. The configuration endpoints may be used to define and configure application users, permissions, robots, assets, releases, and environments in some embodiments. Logging REST endpoints may be used to log different information, such as errors, explicit messages sent by the robots, and other environment-specific information, for instance. Deployment REST endpoints may be used by the robots to query the package version that should be executed if the start job command is used in conductor 230. Queueing REST endpoints may be responsible for queues and queue item management, such as adding data to a queue, obtaining a transaction from the queue, setting the status of a transaction, etc.

Monitoring REST endpoints may monitor web application 232 and agent 214. Notification and monitoring API 236 may be REST endpoints that are used for registering agent 214, delivering configuration settings to agent 214, and for sending/receiving notifications from the server and agent 214. Notification and monitoring API 236 may also use WebSocket communication in some embodiments.

The persistence layer includes a pair of servers in this embodiment—database server 240 (e.g., a SQL server) and indexer server 250. Database server 240 in this embodiment stores the configurations of the robots, robot groups, associated processes, users, roles, schedules, etc. This information is managed through web application 232 in some embodiments. Database server 240 may manages queues and queue items. In some embodiments, database server 240 may store messages logged by the robots (in addition to or in lieu of indexer server 250).

Indexer server 250, which is optional in some embodiments, stores and indexes the information logged by the robots. In certain embodiments, indexer server 250 may be disabled through configuration settings. In some embodiments, indexer server 250 uses ElasticSearch®, which is an open source project full-text search engine. Messages logged by robots (e.g., using activities like log message or write line) may be sent through the logging REST endpoint(s) to indexer server 250, where they are indexed for future utilization.

Figure 3:
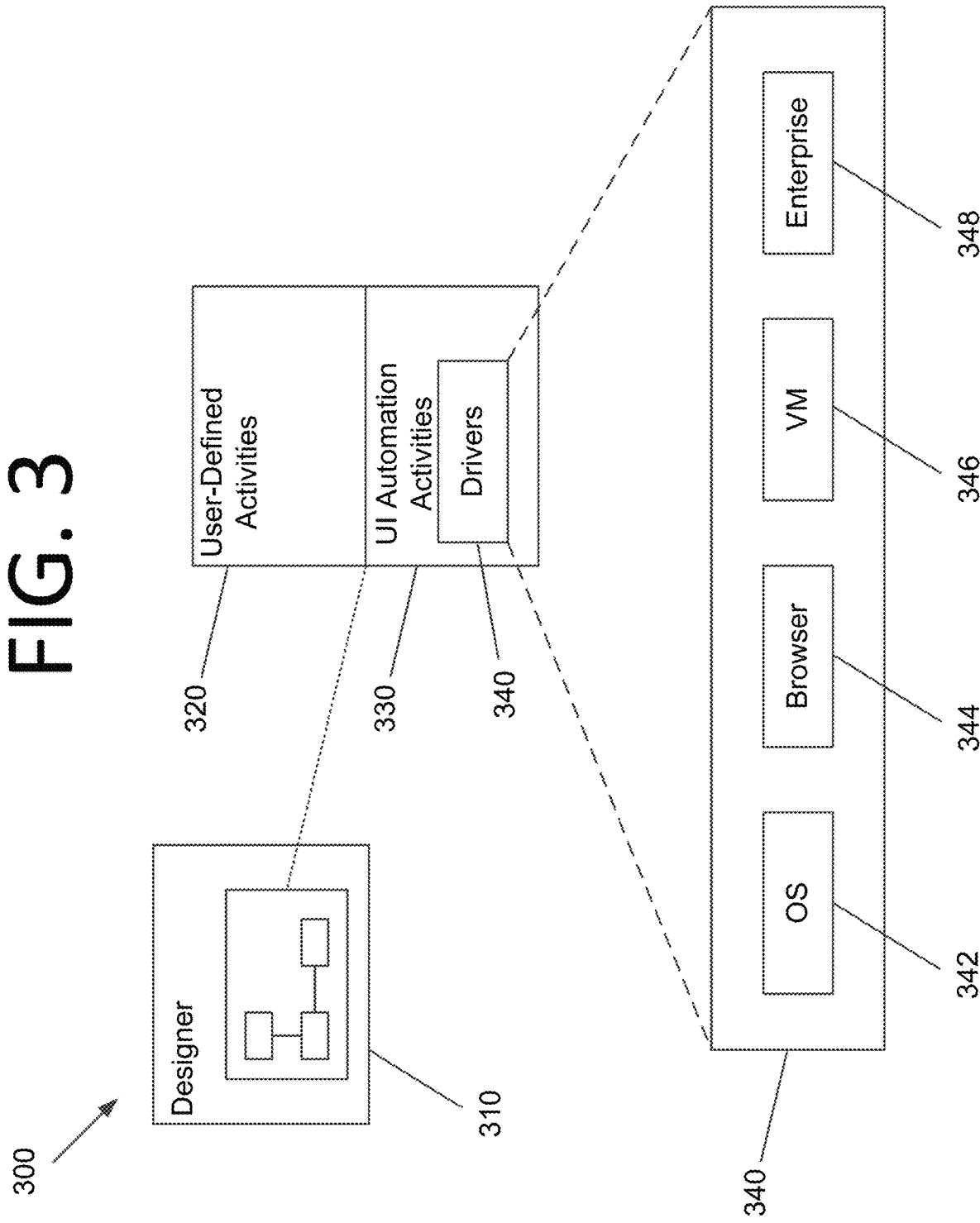
FIG. 3 is an architectural diagram illustrating the relationship between a designer, activities, and drivers, according to an embodiment of the present invention.

FIG. 3 is an architectural diagram illustrating the relationship 300 between a designer 310, activities 320, 330, and drivers 340, according to an embodiment of the present invention. Per the above, a developer uses designer 310 to develop workflows that are executed by robots. Workflows may include user-defined activities 320 and UI automation activities 330. Some embodiments are able to identify non-textual visual components in an image, which is called computer vision (CV) herein. Some CV activities pertaining to such components may include, but are not limited to, click, type, get text, hover, element exists, refresh scope, highlight, etc. Click in some embodiments identifies an element using CV, optical character recognition (OCR), fuzzy text matching, and multi-anchor, for example, and clicks it. Type may identify an element using the above and types in the element. Get text may identify the location of specific text and scan it using OCR. Hover may identify an element and hover over it. Element exists may check whether an element exists on the screen using the techniques described above. In some embodiments, there may be hundreds or even thousands of activities that can be implemented in designer 310. However, any number and/or type of activities may be available without deviating from the scope of the invention.

UI automation activities 330 are a subset of special, lower level activities that are written in lower level code (e.g., CV activities) and facilitate interactions with applications through the UI layer. In certain embodiments, UI automation activities 300 may simulate" user input through window messages or the like, for example. UI automation activities 330 facilitate these interactions via drivers 340 that allow the robot to interact with the desired software. For instance, drivers 340 may include OS drivers 342, browser drivers 344, VM drivers 346, enterprise application drivers 348, etc.

Drivers 340 may interact with the OS at a low level looking for hooks, monitoring for keys, etc. They may facilitate integration with Chrome®, IE®, Citrix®, SAP®, etc. For instance, the "click" activity performs the same role in these different applications via drivers 340.

Figure 4:
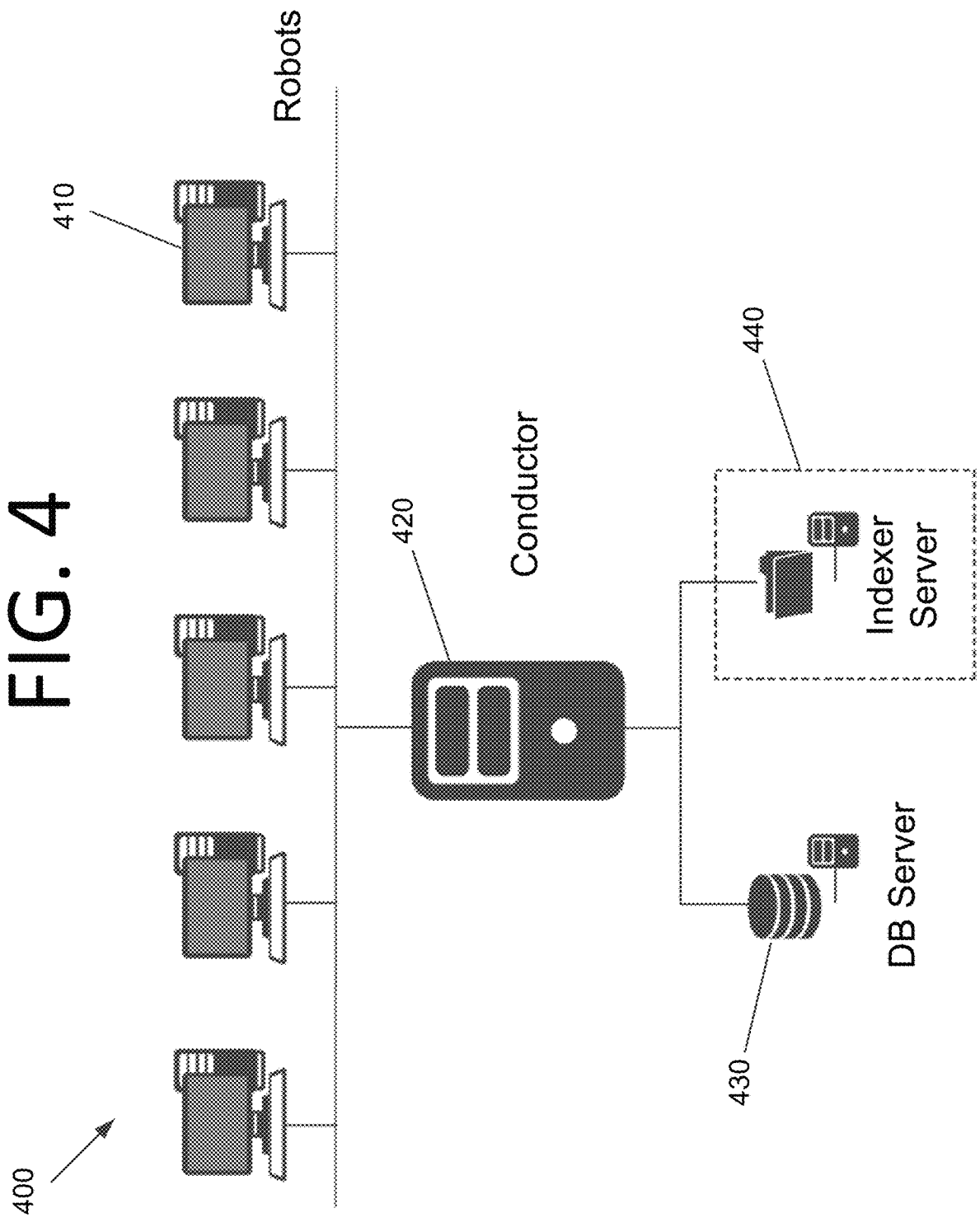
FIG. 4 is an architectural diagram illustrating an RPA system, according to an embodiment of the present invention.

FIG. 4 is an architectural diagram illustrating an RPA system 400, according to an embodiment of the present invention. In some embodiments, RPA system 400 may be or include RPA systems 100 and/or 200 of FIGS. 1 and/or 2. RPA system 400 includes multiple client computing systems 410 running robots. Computing systems 410 are able to communicate with a conductor computing system 420 via a web application running thereon. Conductor computing system 420, in turn, is able to communicate with a database server 430 and an optional indexer server 440.

With respect to FIGS. 1 and 3, it should be noted that while a web application is used in these embodiments, any suitable client and/or server software may be used without deviating from the scope of the invention. For instance, the conductor may run a server-side application that communicates with non-web-based client software applications on the client computing systems.

Figure 5:
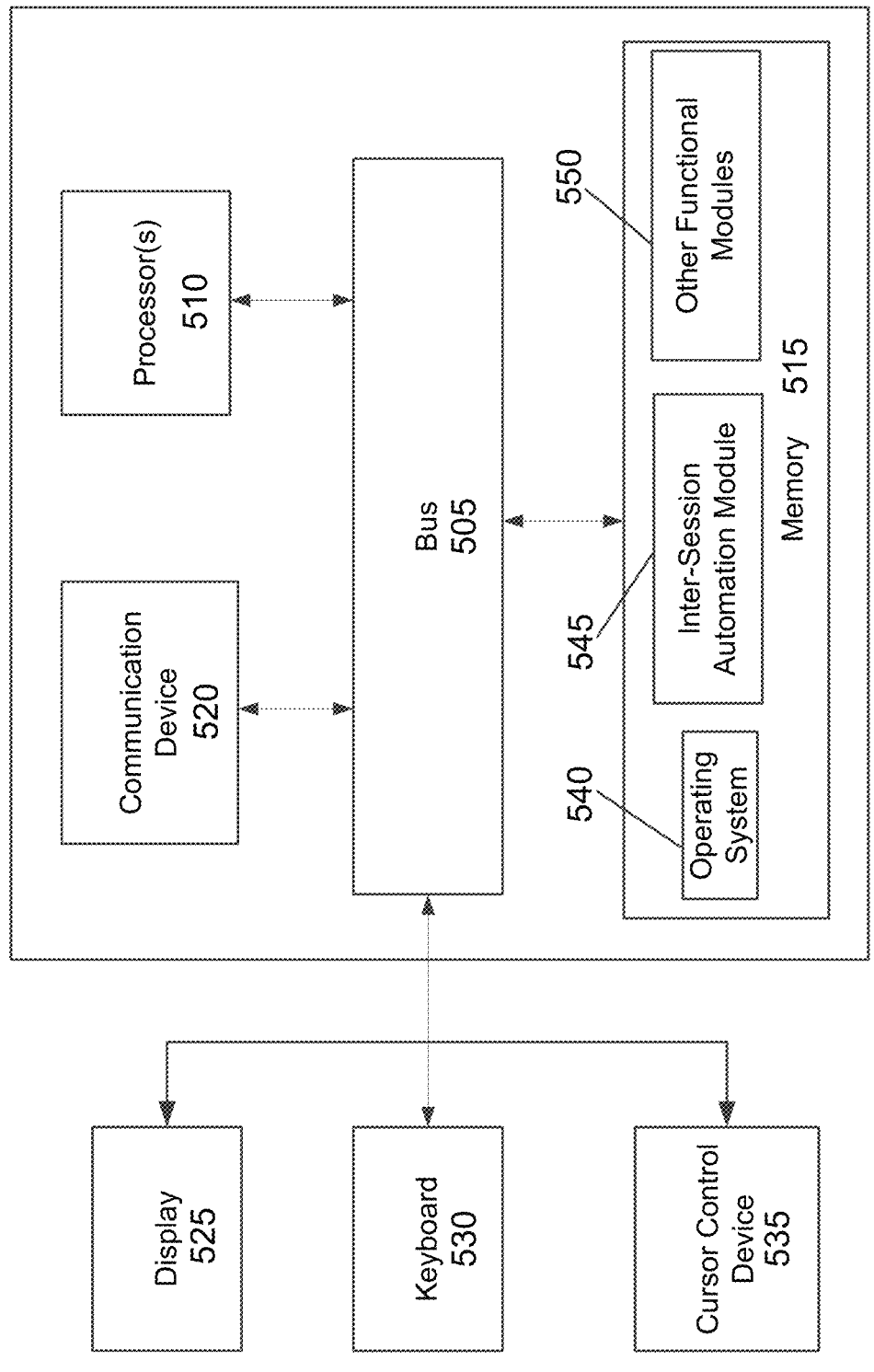
FIG. 5 is an architectural diagram illustrating a computing system configured to facilitate inter-session automation for RPA robots, according to an embodiment of the present invention.

FIG. 5 is an architectural diagram illustrating a computing system 500 configured to facilitate inter-session automation for RPA robots, according to an embodiment of the present invention. In some embodiments, computing system 500 may be one or more of the computing systems depicted and/or described herein. Computing system 500 includes a bus 505 or other communication mechanism for communicating information, and processor(s) 510 coupled to bus 505 for processing information. Processor(s) 510 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 510 may also have multiple processing cores, and at least some of the cores may be configured to perform specific functions. Multi-parallel processing may be used in some embodiments. In certain embodiments, at least one of processor(s) 510 may be a neuromorphic circuit that includes processing elements that mimic biological neurons. In some embodiments, neuromorphic circuits may not require the typical components of a Von Neumann computing architecture.

Computing system 500 further includes a memory 515 for storing information and instructions to be executed by processor(s) 510. Memory 515 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 510 and may include volatile media, non-volatile media, or both. The media may also be removable, non-removable, or both.

Additionally, computing system 500 includes a communication device 520, such as a transceiver, to provide access to a communications network via a wireless and/or wired connection. In some embodiments, communication device 520 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, communication device 520 may include one or more antennas that are singular, arrayed, phased, switched, beamforming, beamsteering, a combination thereof, and or any other antenna configuration without deviating from the scope of the invention.

Processor(s) 510 are further coupled via bus 505 to a display 525, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 525 may be configured as a touch (haptic) display, a three dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 530 and a cursor control device 535, such as a computer mouse, a touchpad, etc., are further coupled to bus 505 to enable a user to interface with computing system 500. However, in certain embodiments, a physical keyboard and mouse may not be present, and the user may interact with the device solely through display 525 and/or a touchpad (not shown). Any type and combination of input devices may be used as a matter of design choice. In certain embodiments, no physical input device and/or display is present. For instance, the user may interact with computing system 500 remotely via another computing system in communication therewith, or computing system 500 may operate autonomously.

Memory 515 stores software modules that provide functionality when executed by processor(s) 510. The modules include an operating system 540 for computing system 500. The modules further include an inter-session automation module 545 that is configured to perform all or part of the processes described herein or derivatives thereof. Computing system 500 may include one or more additional functional modules 550 that include additional functionality.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Per the above, in attended automation, a robot works alongside a user on the same computing system. Since robots in RPA often interact with the computing system in a similar manner (e.g., generating mouse click and key press events, simulating these events via APIs (e.g., using window messages), etc.), some embodiments create one or more robot sessions to host and run attended automations therein. Unlike existing RPA systems, users can benefit from the ability to interact with their computing system while the robot(s) are running attended automations in the robot session(s). The user may still monitor what the robot is doing and interact with the robot through host automation window(s) for the robot session(s) in some embodiments. This effectively evolves the RPA robot from merely doing tasks faster and more reliably than the human user to becoming a true digital assistant that can perform work in parallel with the user, providing an even greater productivity boost. In some embodiments, the user and robot session(s) may be running on a remote machine that is controlled by the user's computing system.

In certain embodiments, the RPA robot may be running on a user's computing system and driving a remote computing system through the remote runtime (e.g., via UiPath Remote Runtime™). UiPath Remote Runtime™ is a component that facilitates the communication between a remote application or desktop, such as Citrix Virtual Apps and Desktops™, and the dedicated UiPath® extension (e.g., the UiPath® extension for Citrix® or the UiPath® extension for Windows® Remote Desktop). UiPath Remote Runtime™ gathers information pertaining to targeted UI elements of remote applications and sends this information to the corresponding extension so that selectors are natively generated in UI Explorer™. In certain embodiments, robots may use Microsoft's AppV technology, which "virtually delivers" client applications to a machine.

Figure 6:
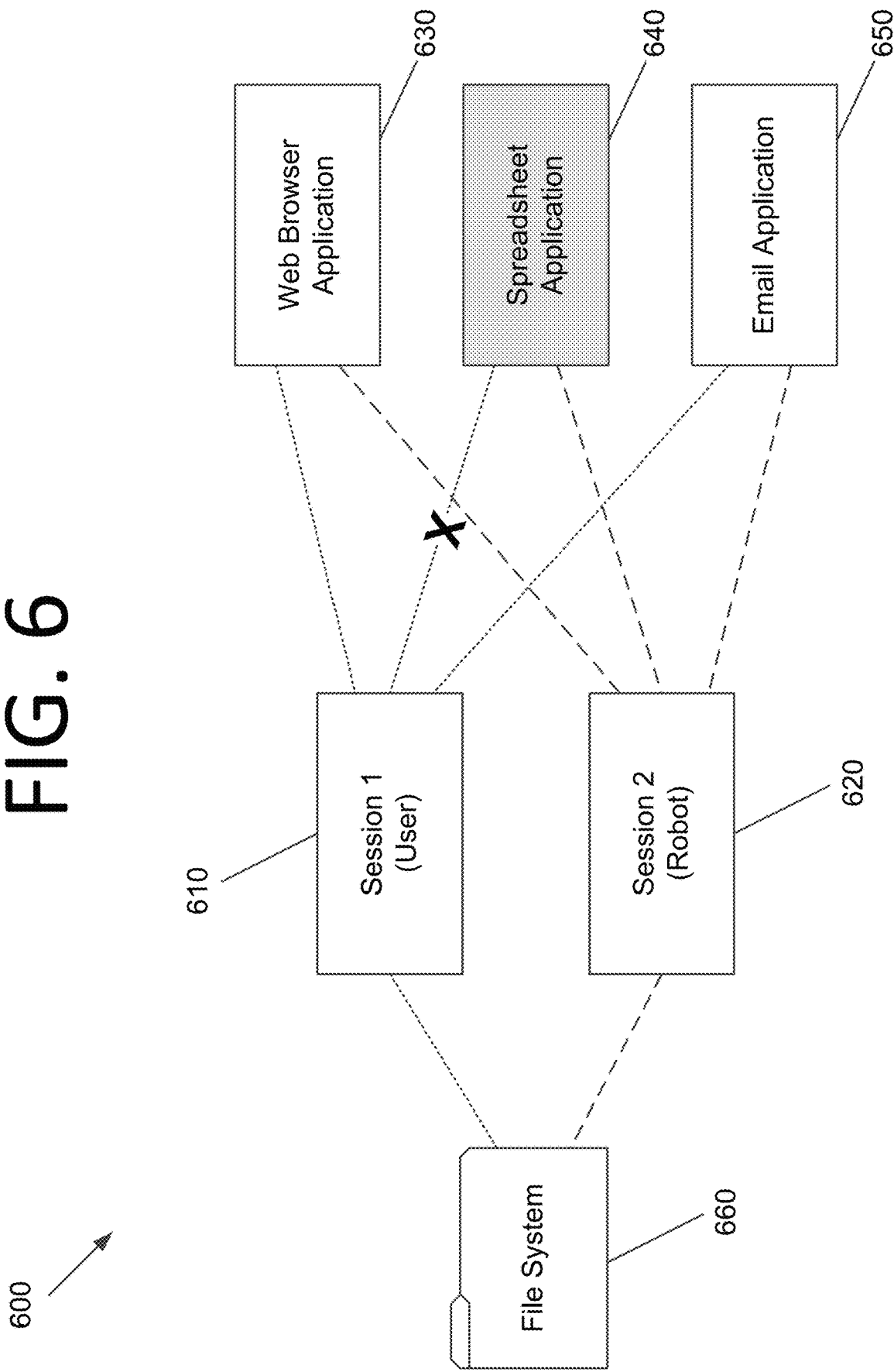
FIG. 6 illustrates some applications and a file system of a user computing system accessed by a user in a user session and an RPA robot in a robot session, according to an embodiment of the present invention.

As stated previously, in some embodiments, the user and the robot are both interacting with the same application instances and file system. FIG. 6 illustrates some applications and a file system 660 of a user computing system 600 accessed by a user in a user session 610 and an RPA robot in a robot session 620, according to an embodiment of the present invention. As can be seen in FIG. 6, web browser application 630, spreadsheet application 640, and email application 650 are accessible by both user session 610 and attended automation robot session 620. User session 610 and attended automation robot session 620 can interact with web browser application 630 and email application 650 at the same time.

However, when the robot is interacting with the same file of an Excel® spreadsheet application 640, the user cannot interact with this application (e.g., the user may only be able to open a "read only" view or the user may be prevented from opening the file entirely). However, if the automation is using the Office 365 APIs to use a spreadsheet hosted on a user's OneDrive®, for example, and the user is accessing the spreadsheet through the web interface, no such limitation may exist. Google Sheets® is entirely web delivered and does support concurrent access, for instance. The user may receive a message indicating that spreadsheet application 640 is locked, is being accessed by another "user" (i.e., the robot), etc. Both user session 610 and attended automation robot session 620 can also interact with file system 660. Thus, changes made via the robot and the user in an application via their respective sessions will be made as if a single user made them, rather than having the user and the robot each work with separate versions of the applications and file systems.

Figure 7B:
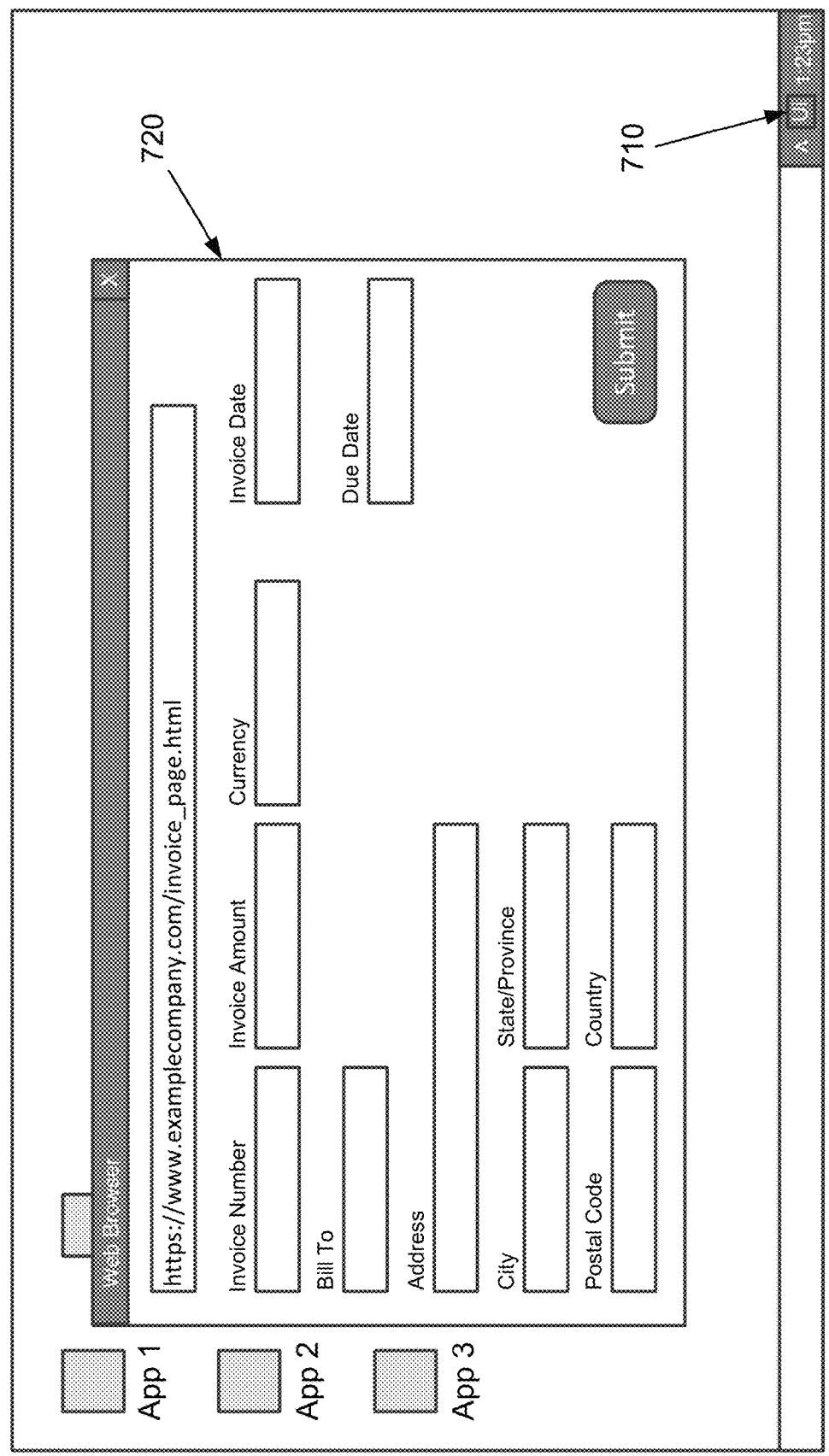

FIGS. 7A-J are screenshots illustrating an example of completing a form in a user session using an RPA robot running in a client session and a user session robot or another application or process running in the user session, according to an embodiment of the present invention. In FIG. 7A, a user session window 700 is shown, where a user is able to interact with applications in the UI and no robots are currently executing. A robot tray icon 710 is visible in the lower right portion of user session window 700.

Figure 7C:
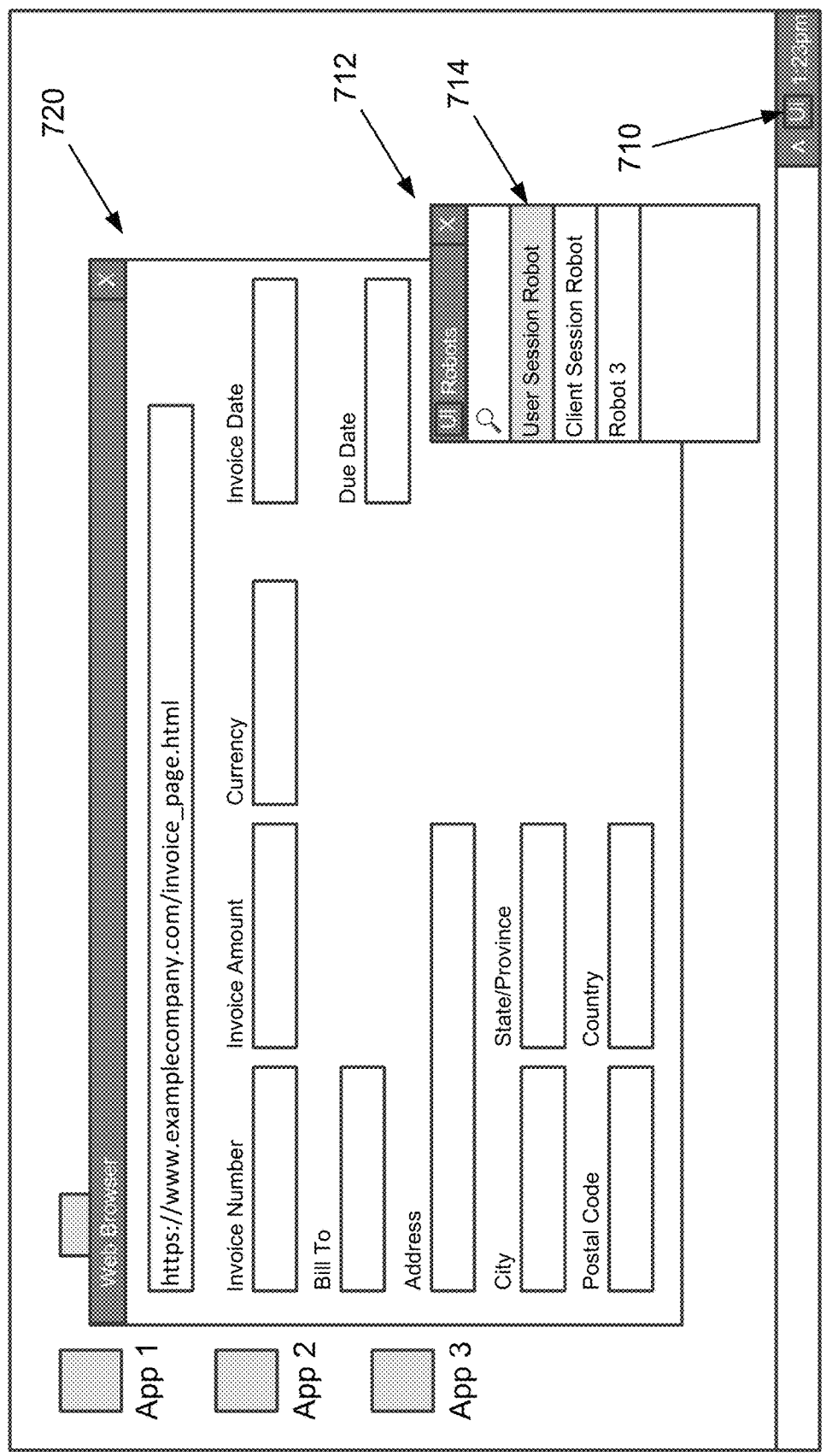
Figure 7D:
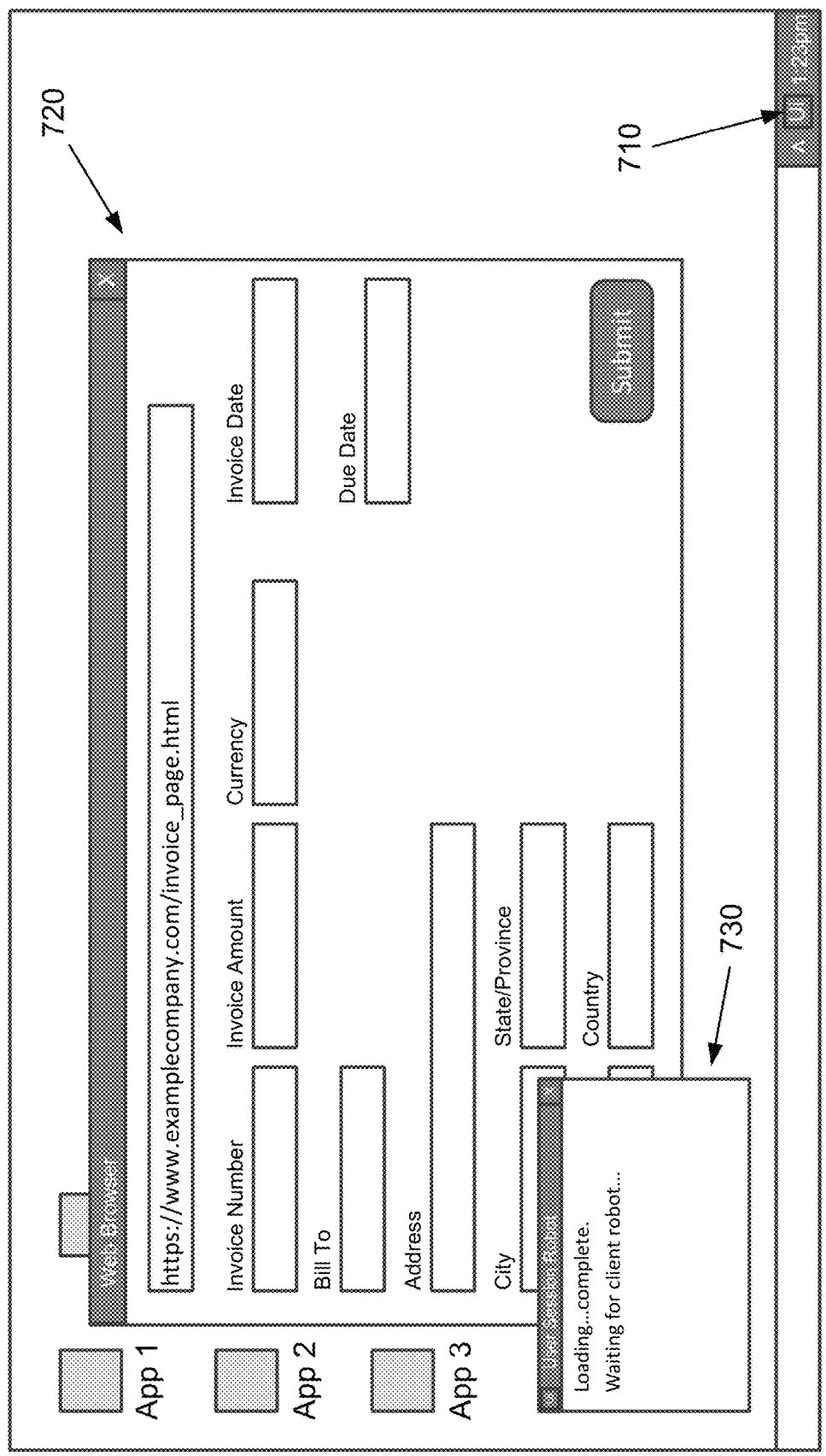

In FIG. 7B, the user launches a web browser and visits an invoice creation web page 720. In FIG. 7C, the user pulls up a robot tray 712 (e.g., by clicking robot tray icon 710) and selects a user session robot option 714 to execute on his or her computing system in the user session. After selecting user session robot option 714, a user session robot window 730 appears. See FIG. 7D. In this embodiment, the user session robot only displays status messages. However, the user session robot may have any desired workflow functionality without deviating from the scope of the invention. In some embodiments, the user session robot automatically launches a client session robot, or selecting the option to run the user session robot automatically launches both robots in their respective sessions.

In some embodiments, no window is displayed for the user session robot, which may run in the background. In certain embodiments, another application or process performs the functionality of the user session robot. This functionality may include, but is not limited to, communicating with one or more client session robots, retrieving data provided by the client session robot(s), interacting with an application running in the user session to enter the retrieved information, etc. In some embodiments, rather that using a user session robot, another application, or another process, an application into which the information retrieved by the client session robot should be entered is entered by that application itself. This may be done without simulating mouse clicks, key presses, etc. in some embodiments.

Figure 7E:
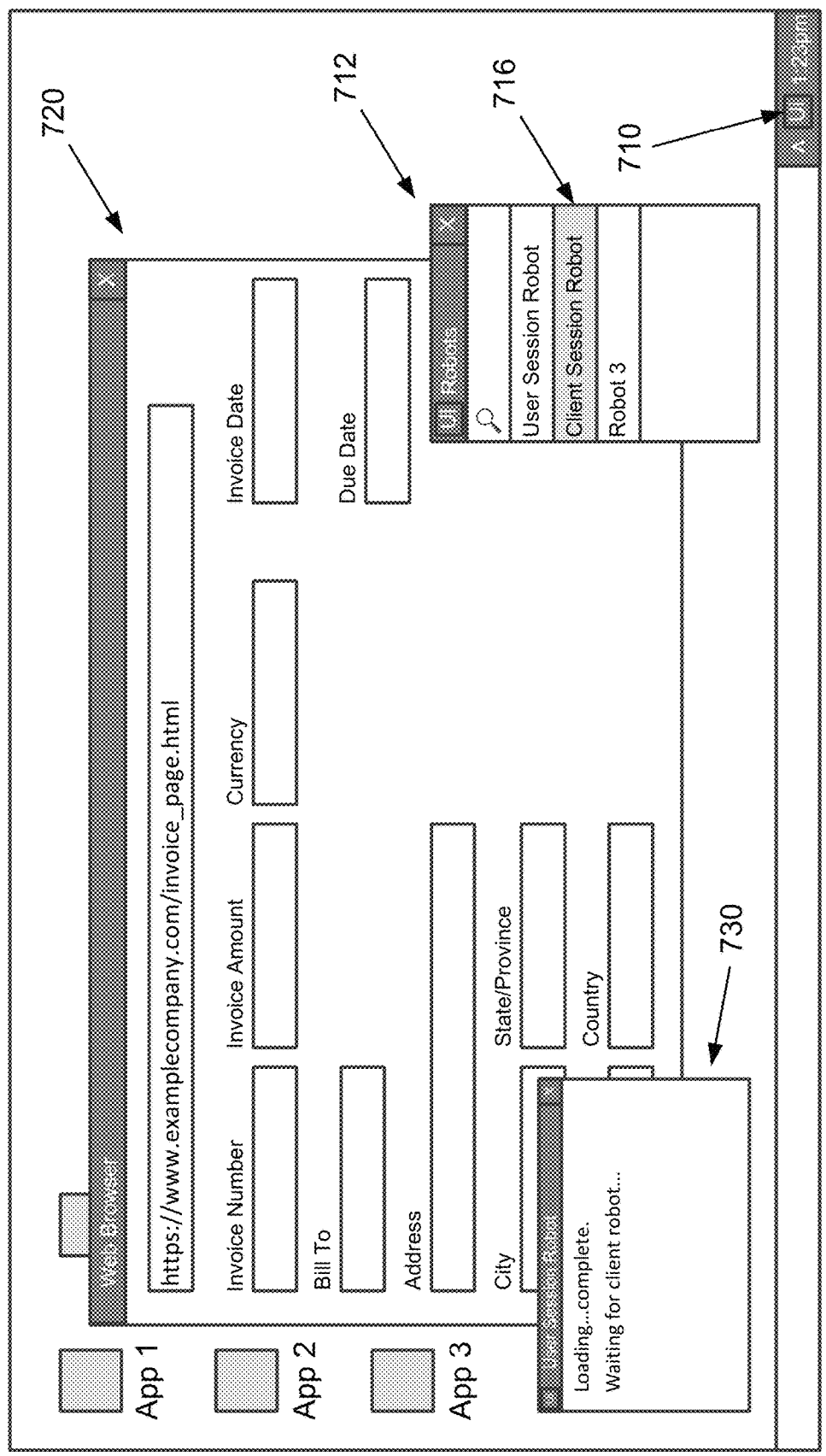

In FIG. 7E, the user pulls up robot tray 712 and selects a client session robot option 716 to execute on his or her computing system in a client session. After selecting client session robot option 716, a client session window 740 for a robot session appears as a child window on the screen, as shown in FIG. 7F. However, in some embodiments, client session window 740 is not displayed and the client session robot runs in the client session without being visible to the user. In this embodiment, a client session robot window 742 for the client session robot automatically launches within client session window 740, and includes a button 744 to fetch form data for web page 720 in the user session.

In some embodiments, a robot session window is not displayed, and the client session robot may launch, operate, and close automatically without being visible to the user. In certain embodiments, the client session robot may close its session after completing its workflow. In some embodiments, rather than launching from a robot tray, the client session may be initiated and the client session robot may launch and operate without the use of robot tray 712 (e.g., due to the user clicking a button in an application of the main session).

Figure 7G:
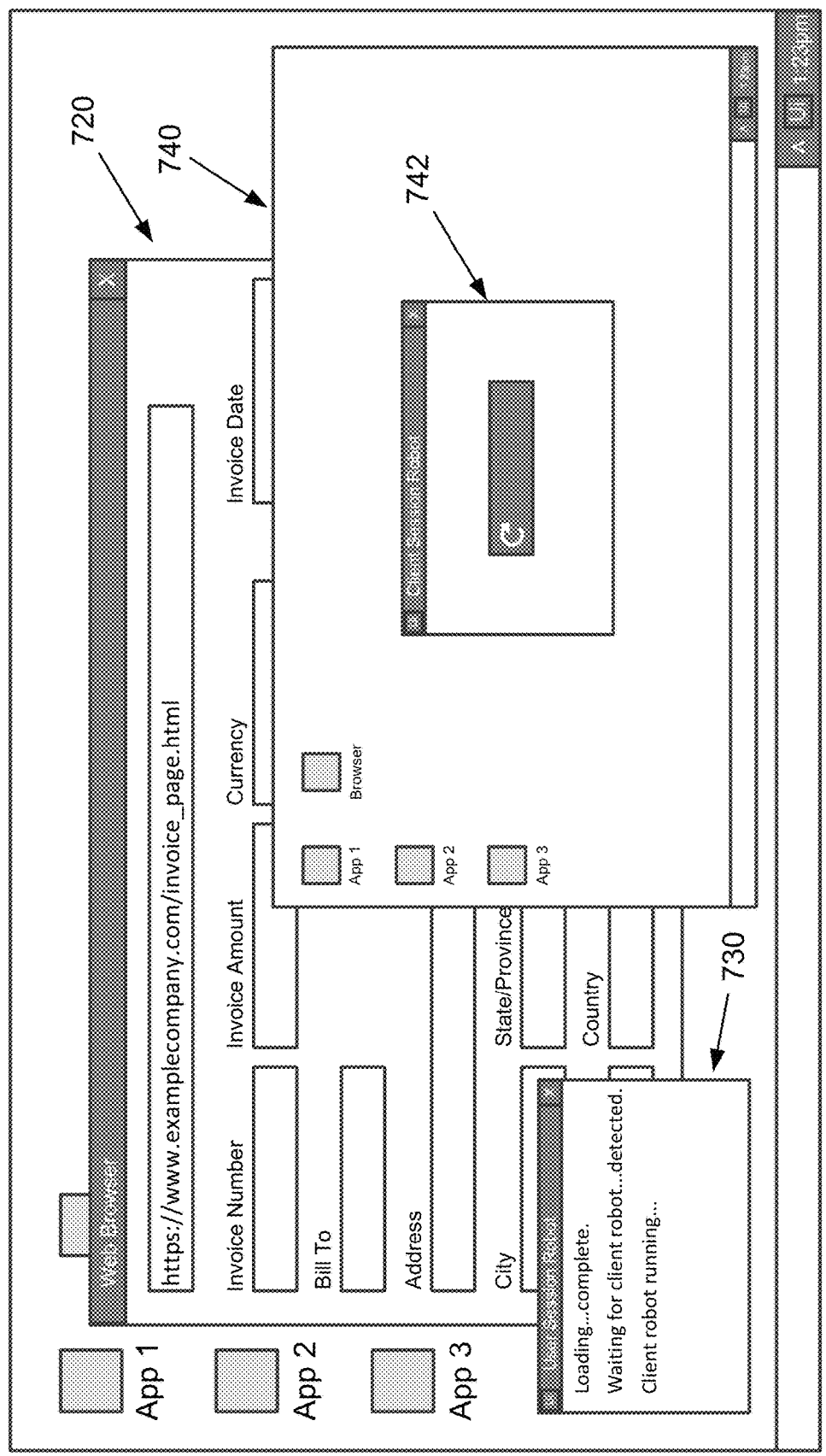
Figure 7J:
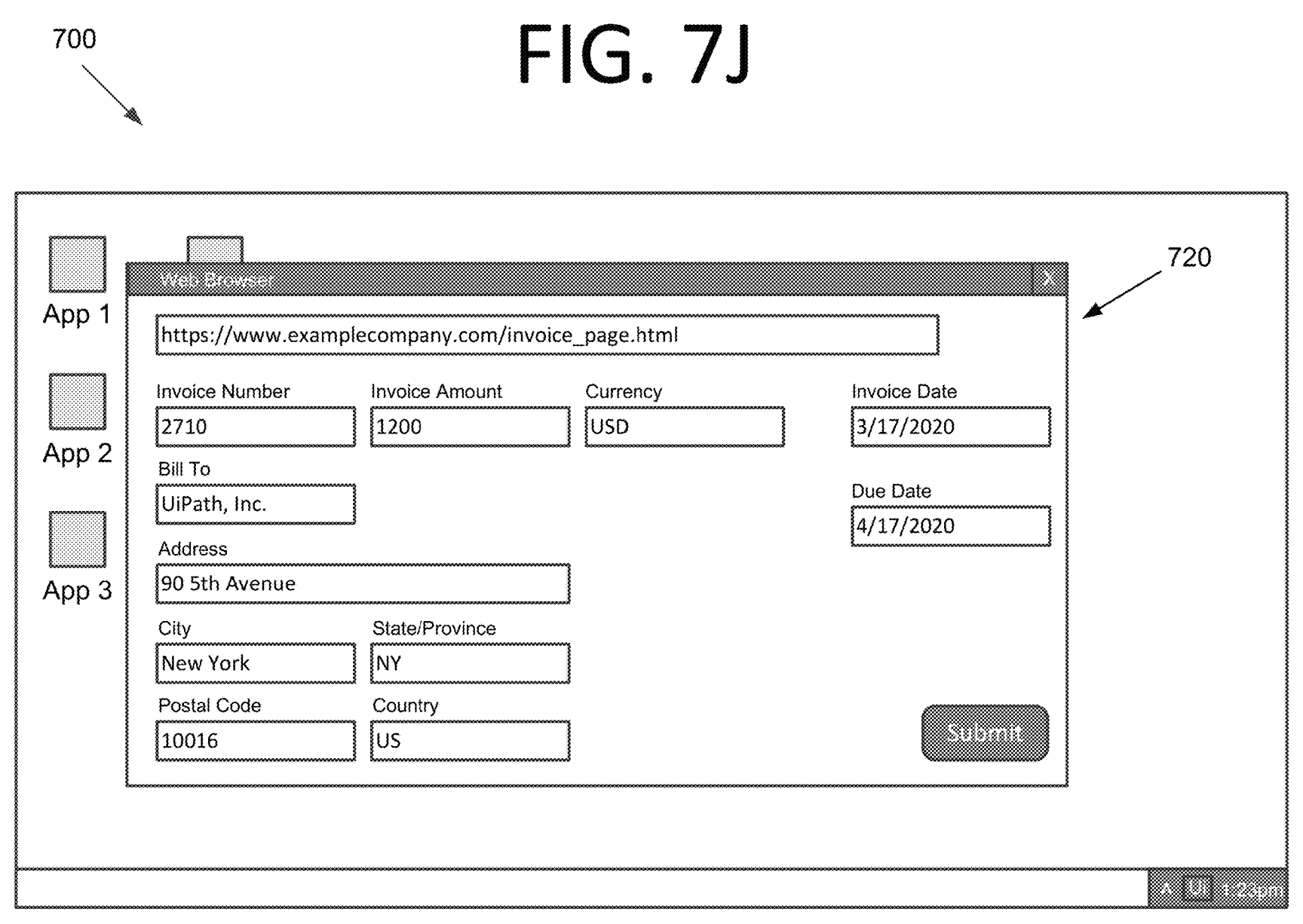

Turning to FIG. 7G, after the user clicks button 744, the client session robot begins fetching form data for web page 720. The data fetched by the client session robot may be provided to the user session robot via IPC, stored in a spreadsheet, an object-oriented database, a plain text file, etc., or otherwise communicated or made available for the user session robot. After the client session robot completes its workflow, a message is displayed in client session robot window 742. See FIG. 7H. The user session robot then beings using the form data fetched by the client session robot to fill in the fields of web page 720. The text entered by the user session robot is visible to the user when web page 720 is not covered by another window or minimized. While the user session robot completes the form, the user can interact with other applications and continue to be productive.

Turning to FIG. 7I, as can be seen in the background, the user session robot has completed the form fields in web page 720. The user may then close out client session window 740 and user session robot window 730, the user session robot or client session robot may close the client session automatically, or client session window 740 may stay open. The user may then submit the completed form. See FIG. 7J.

Figure 8:
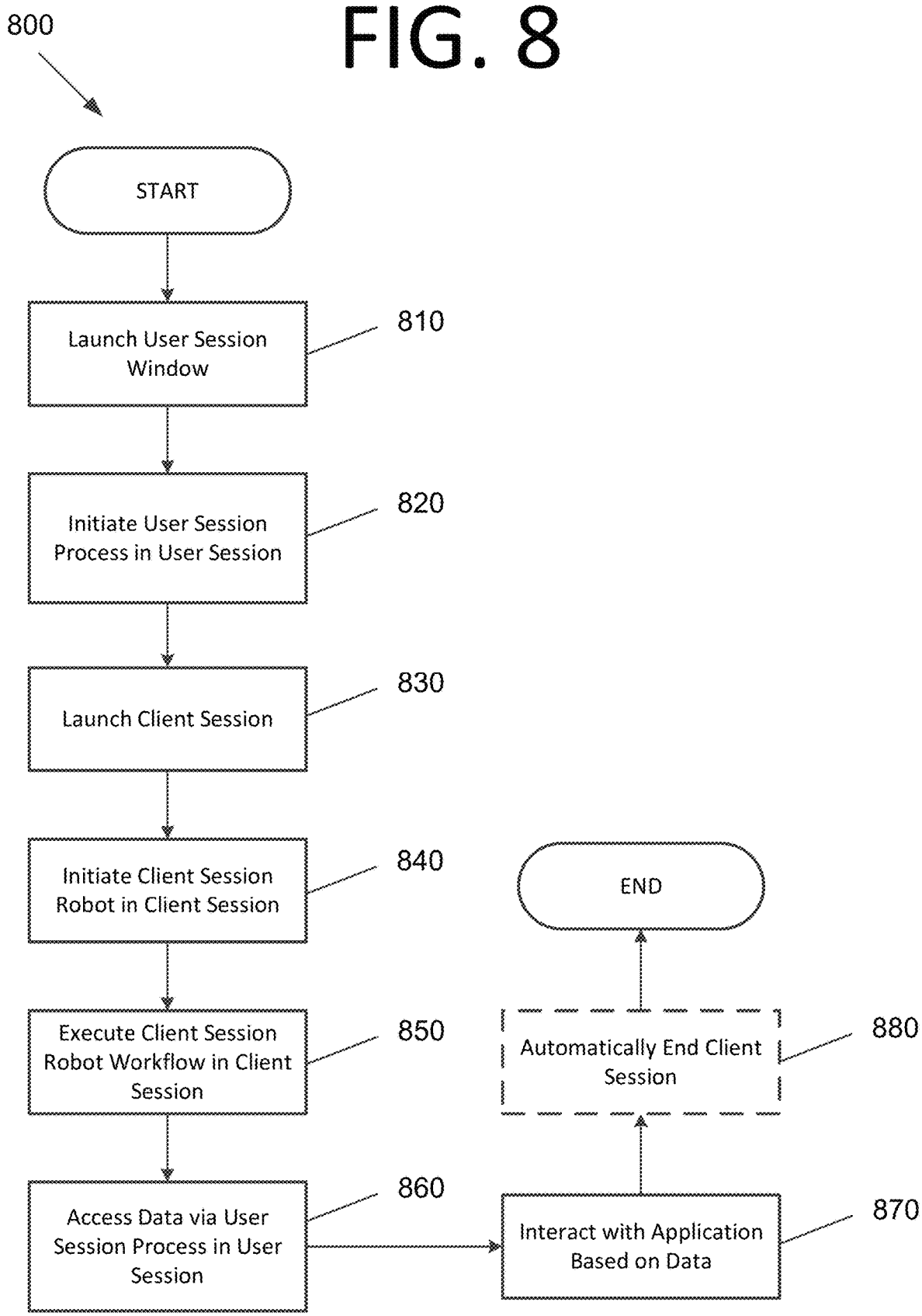
FIG. 8 is a flowchart illustrating a process for inter-session automation, according to an embodiment of the present invention.

FIG. 8 is a flowchart illustrating a process 800 for inter-session automation, according to an embodiment of the present invention. The process begins with launching a user session window at 810. This may be the main window associated with the operating system running on the user computing system, for example. A user session process (e.g., an RPA robot, an application, another process, etc.) is then initiated in the user session at 820. A client session is launched at 830 and a client session robot is initiated in the client session at 840. In some embodiments, the client session may be launched responsive to the client session robot being initiated or otherwise launched, for example. The client session robot then executes its workflow at 850. Data retrieved and/or actions taken by the client session robot may be provided to or made available to the user session process in some embodiments. The user session process then accesses the data produced by the client session robot at 860 and interacts with appropriate application(s) (e.g., web pages, spreadsheets, ERP applications, sales applications, etc.) based on the data at 870. In some embodiments, the application(s) that are interacted with may be the user session process itself. After the client session robot completes its execution, the client session may be ended automatically in some embodiments at 880.

In some embodiments, the client session may be created via a child session API of the operating system. Windows® Terminal Services Child Sessions or another child session API provided by an operating system may be used in some embodiments to create the second session without deviating from the scope of the invention. The robot tray application (e.g., the UiPath® Robot Agent Desktop) or another application configured to launch robot(s) may then use the create process APIs in the operating system with the appropriate arguments to start the robot process in that child session. The robot tray application or other suitable application may then communicate with the client robot process using a suitable protocol (e.g., one built on named pipes).

Communication with the client robot between the two sessions may be accomplished using IPC protocols in some embodiments. These protocols may facilitation communication via the network, pipes, Component Object Model (COM), Remote Procedure Calls (RPC), sockets, etc. Suitable session creation mechanisms and IPC protocols may be used for other operating systems as well, where supported. When the user clicks a button on the robot tray or causes another application to initiate such functionality (e.g., by clicking a button), the robot tray application or other suitable application may send that command to the client session robot process using the IPC protocol. The client session robot may send status notifications back to the robot tray application or other suitable process (e.g., indicating that the robot is starting, running, paused, etc.) via the IPC protocol as well.

Figure 9:
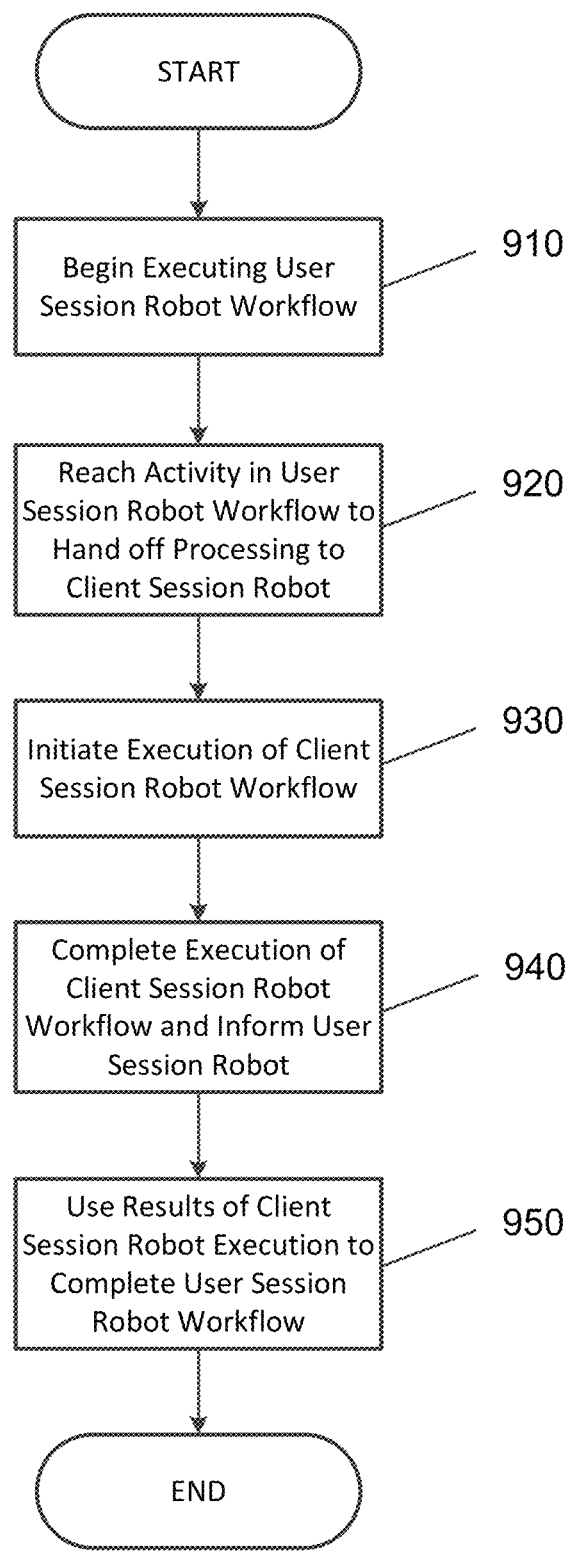
FIG. 9 is a flowchart illustrating a process for inter-session automation where one robot runs in a user session and the other robot runs in a client session, according to an embodiment of the present invention.

FIG. 9 is a flowchart illustrating a process 900 for inter-session automation where one robot runs in a user session and the other robot runs in a client session, according to an embodiment of the present invention. The process begins with beginning execution of the user session robot workflow at 910. When the user session robot reaches an activity in its workflow that calls for the client robot to execute at 920, the user session robot causes the client session robot to execute its workflow at 930 and waits for the completion thereof.

The client session robot completes its workflow and informs the user session robot at 940. The user session robot then uses the results of the client session robot execution to complete the remainder of the user session robot workflow at 950. In some embodiments, the user session robot and the client session robot collectively complete a single logical workflow.

Figure 10:
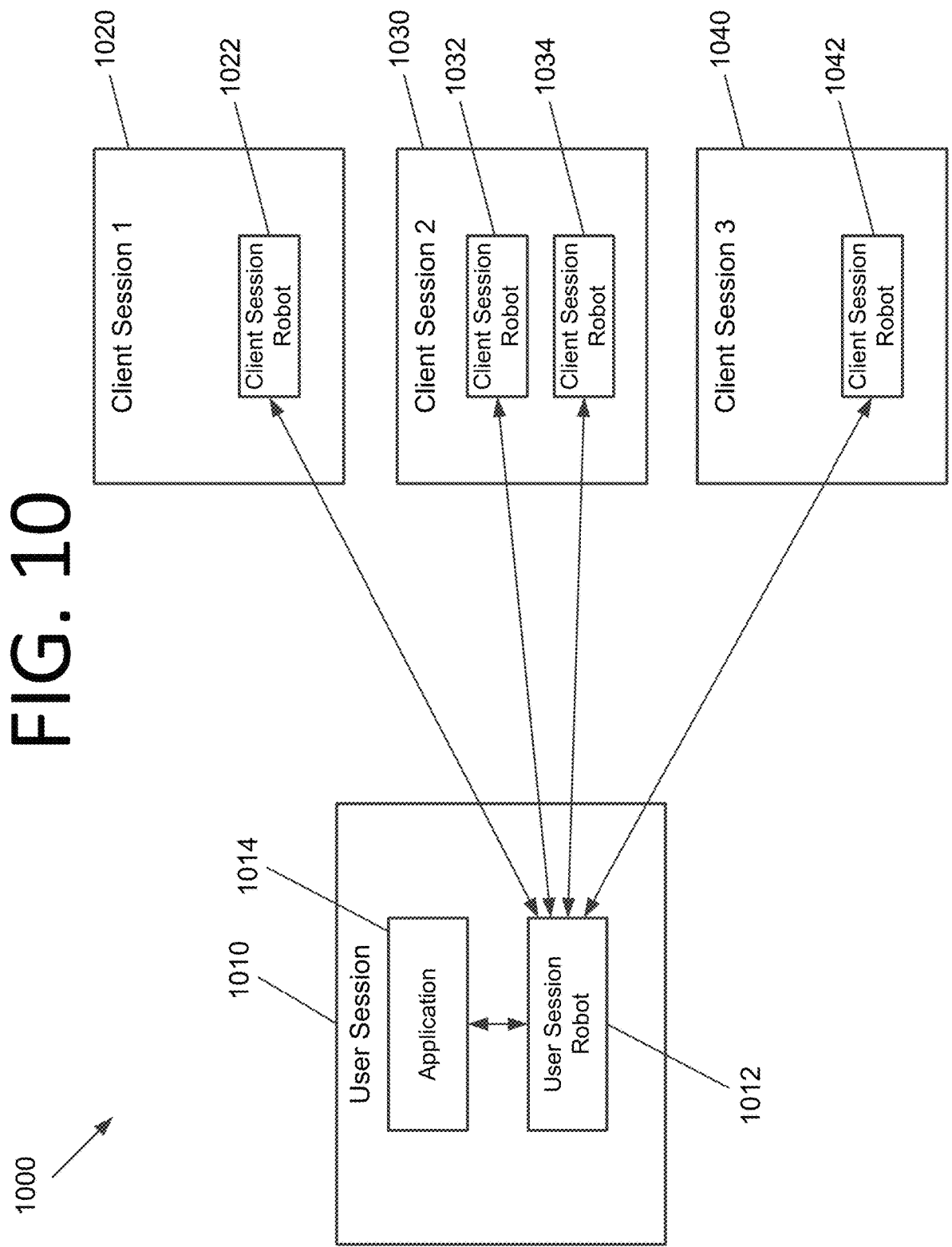
FIG. 10 illustrates a scenario where part of a workflow is completed by a user session robot and other parts of the workflow are completed by client session robots, according to an embodiment of the present invention.

In certain embodiments, multiple client session robots may be used, potentially with at least some client session robots in different client sessions. This may enable the user session robot to pass off portions of workflow activities to client session robots for completion. FIG. 10 illustrates a scenario 1000 where part of a workflow is completed by a user session robot and other parts of the workflow are completed by client session robots, according to an embodiment of the present invention. A user session 1010 includes a user session robot 1012 and an application 1014. A first client session 1020 includes a client session robot 1022, a second client session 1030 includes two client session robots 1032, 1034, and a third client session 1040 include a client session robot 1042. User session robot 1012 may communicate with and control the operation of client session robots 1022, 1032, 1034, 1042 via IPC, for example. It should be noted that in some embodiments, the user session robot continues the execution of its workflow while the client session robot(s) complete their respective workflows.

Figure 11:
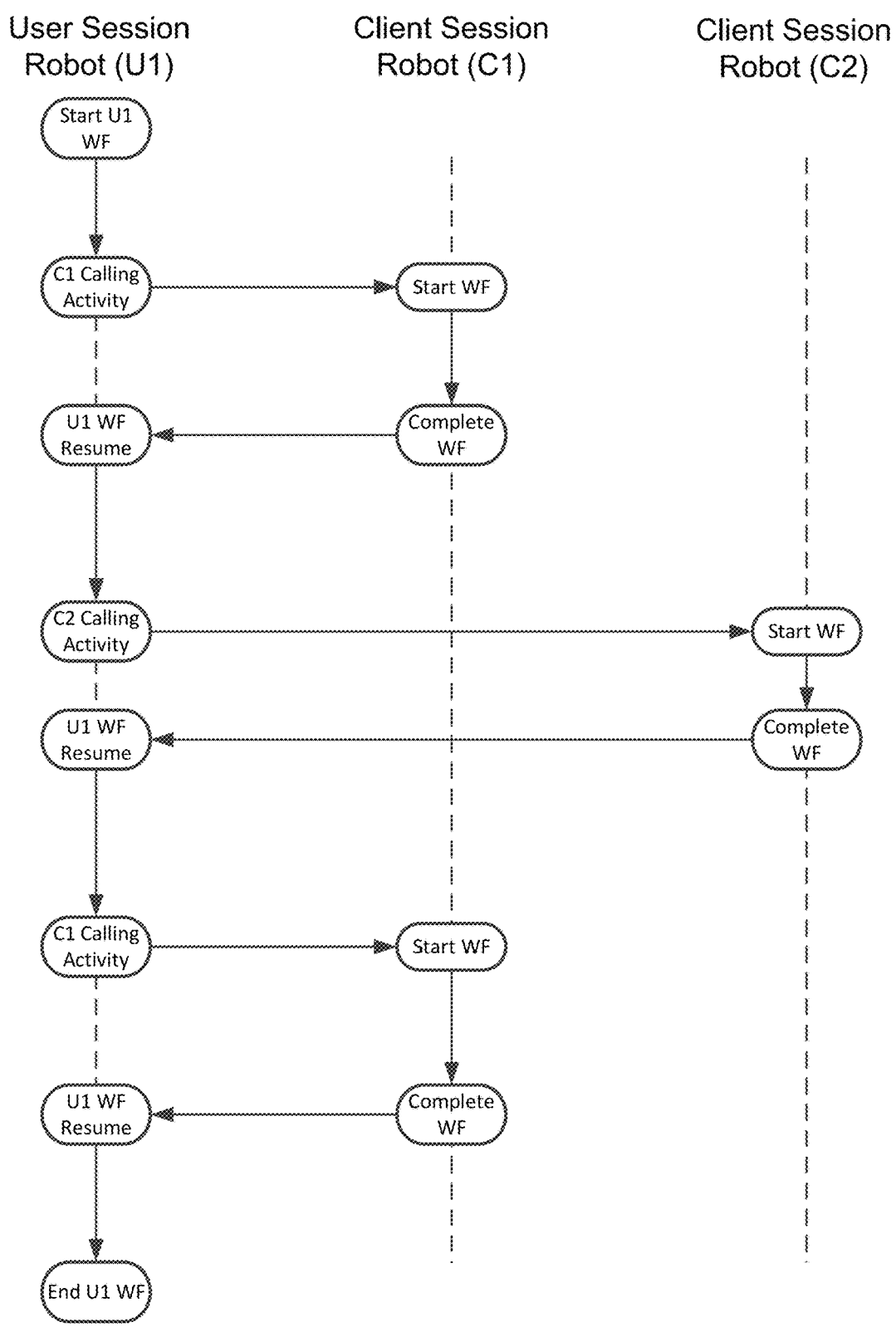
FIG. 11 is a flow diagram illustrating execution of a multi-robot collective workflow between a user session robot U1 and a pair of client session robots C1 and C2, according to an embodiment of the present invention.

FIG. 11 is a flow diagram 1100 illustrating execution of a multi-robot collective workflow between a user session robot U1 and a pair of client session robots C1 and C2, according to an embodiment of the present invention. C1 and C2 may be in the same client session or different client sessions. U1 begins executing its workflow and reaches an activity that calls for C1 to complete a workflow. U1 causes C1 to execute its workflow and the calling activity waits. During this time, U1 may perform other tasks in some embodiments.

After C1 completes its workflow, U1 resumes execution until it reaches an activity that calls for C2 to complete a workflow. U1 causes C2 to execute its workflow and the calling activity waits. Once again, U1 may perform other tasks while waiting for C2 in some embodiments.

After C2 completes its workflow, U1 resumes execution until it reaches an activity that once again calls for C1 to complete a workflow. This may be the same workflow activities as previously executed or a different workflow or set of activities. U1 causes C1 to execute its workflow and the calling activity waits. Once again, U1 may perform other tasks while waiting for C1 in some embodiments. After C1 completes its workflow, U1 resumes execution until the workflow of U1 is completed.

The process steps performed in FIGS. 8, 9, and 11 may be performed by a computer program, encoding instructions for the processor(s) to perform at least part of the process(es) described in FIGS. 8, 9, and 11 in accordance with embodiments of the present invention. The computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) of a computing system (e.g., processor(s) 510 of computing system 500 of FIG. 5) to implement all or part of the process steps described in FIGS. 8, 9, and 11, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented method, comprising:
launching a user process;
launching a first robotic process automation (RPA) robot in a first session;
executing a workflow of the first RPA robot in the first session, by the first RPA robot;
making results of the execution of the workflow of the first RPA robot available to the user process, by the first RPA robot; and
interacting with a user application using the results of the execution of the workflow of the first RPA robot, by the user process, wherein
the user process performs other tasks while waiting for the first RPA robot to complete the execution of the workflow of the first RPA robot.

2. The computer-implemented method of claim 1, wherein
the interaction with the user application comprises entering information into a form, and
the results of the execution of the RPA workflow comprise data used by the user process to enter the information into the form.

3. The computer-implemented method of claim 1, wherein the user process comprises an RPA robot.

4. The computer-implemented method of claim 1, wherein the first RPA robot is visible in a window associated with the first session.

5. The computer-implemented method of claim 1, wherein the first RPA robot is not visible.

6. The computer-implemented method of claim 1, wherein the user process waits for the first RPA robot to complete the execution of the workflow of the first RPA robot.

7. The computer-implemented method of claim 1, further comprising:

launching a second RPA robot in the first session or a second session;

executing a workflow of the second RPA robot in the first session or the second session, by the second RPA robot; and making results of the execution of the workflow of the second RPA robot available to the user process, by the second RPA robot.

8. The computer-implemented method of claim 1, wherein the first session and the first RPA robot are launched by the user process.

9. The computer-implemented method of claim 1, further comprising:

automatically closing the first RPA robot and the first session after the first RPA robot completes execution of the workflow of the first RPA robot.

10. The computer-implemented method of claim 1, wherein the user process comprises a user process RPA robot, and
the user process RPA robot and the first RPA robot collectively complete execution of a larger workflow that includes the workflow of the first RPA robot.

11. The computer-implemented method of claim 1, wherein the user process is not directly accessible by the first RPA robot.

12. A computer-implemented method, comprising:

executing a workflow of a first robotic process automation (RPA) robot in a session, by the first RPA robot;

making results of the execution of the workflow of the first RPA robot available to a user process RPA robot, by the first RPA robot; and interacting with an application on a computing system using the results of the execution of the workflow of the first RPA robot, by the user process RPA robot, wherein the user process RPA robot performs other tasks while waiting for the first RPA robot to complete the execution of the workflow of the first RPA robot.

13. The computer-implemented method of claim 12, wherein the interaction with the application on the computing system comprises entering information into a form, and the results of the execution of the RPA workflow comprise data used by the user process RPA robot to enter the information into the form.

14. The computer-implemented method of claim 12, wherein the user process RPA robot performs other tasks while waiting for the first RPA robot to complete the execution of the workflow of the first RPA robot.

15. The computer-implemented method of claim 12, further comprising:

commanding the first RPA robot to execute the workflow of the first RPA robot via Inter-Process Communication (IPC), by the user process RPA robot; and receiving the results of the execution of the workflow of the first RPA robot, by the user process RPA robot.

16. The computer-implemented method of claim 12, wherein the user process RPA robot and the first RPA robot collectively complete execution of a larger workflow that includes the workflow of the first RPA robot.

17. The computer-implemented method of claim 12, wherein at least one process accessible by the user process RPA robot is not directly accessible by the first RPA robot.

18. A computer-implemented method, comprising:

executing a workflow of a first robotic process automation (RPA) robot in a client session, by the first RPA robot;

making results of the execution of the workflow of the first RPA robot available to a user process RPA robot, by the first RPA robot; and interacting with an application on a computing system using the results of the execution of the workflow of the first RPA robot, by the user process RPA robot, wherein the user process RPA robot and the first RPA robot collectively complete execution of a larger workflow that includes the workflow of the first RPA robot, wherein the user process RPA robot performs other tasks while waiting for the first RPA robot to complete the execution of the workflow of the first RPA robot.

19. The computer-implemented method of claim 18, further comprising:

commanding the first RPA robot to execute the workflow of the first RPA robot via Inter-Process Communication (IPC), by the user process RPA robot; and receiving the results of the execution of the workflow of the first RPA robot, by the user process RPA robot.

20. The computer-implemented method of claim 18, wherein the interaction with the application comprises entering information into a form, and the results of the execution of the RPA workflow comprise data used by the user process RPA robot to enter the information into the form.

21. The computer-implemented method of claim 18, wherein at least one process accessible by the user process RPA robot is not directly accessible by the first RPA robot.

* * * * *